(12) United States Patent
Chen et al.

(10) Patent No.: US 11,931,766 B2
(45) Date of Patent: Mar. 19, 2024

(54) PLURAL MATERIAL DISPENSING SYSTEM

(71) Applicant: Graco Minnesota Inc., Minneapolis, MN (US)

(72) Inventors: Guang Chen, Suzhou (CN); Qiang Xiao, Shanghai (CN)

(73) Assignee: Graco Minnesota Inc., Minneapolis, MN (US)

( * ) Notice: Subject to any disclaimer, the term of this patent is extended or adjusted under 35 U.S.C. 154(b) by 411 days.

(21) Appl. No.: 17/298,304

(22) PCT Filed: Nov. 29, 2018

(86) PCT No.: PCT/CN2018/118162
§ 371 (c)(1),
(2) Date: May 28, 2021

(87) PCT Pub. No.: WO2020/107318
PCT Pub. Date: Jun. 4, 2020

(65) Prior Publication Data
US 2022/0048063 A1 Feb. 17, 2022

(51) Int. Cl.
B05C 11/10 (2006.01)
G01F 11/02 (2006.01)
G01F 15/00 (2006.01)

(52) U.S. Cl.
CPC ........ B05C 11/1036 (2013.01); G01F 11/029 (2013.01); G01F 15/005 (2013.01)

(58) Field of Classification Search
CPC .. B05C 11/1036; G01F 11/029; G01F 15/005; B01F 25/40; F04B 7/00;
(Continued)

(56) References Cited

U.S. PATENT DOCUMENTS 4,067,479 A    1/1978  Moline
5,979,794 A *  11/1999  DeFillipi ............. B01F 25/4314
                                                        239/432
(Continued)

FOREIGN PATENT DOCUMENTS

AU    2015362803 A1    4/2017
CN    101370433 A    2/2009
(Continued)

OTHER PUBLICATIONS

First Chinese Office Action for CN Application No. 2018800998620, dated Jul. 13, 2022, pp. 12.
(Continued)

*Primary Examiner* — Donnell A Long
(74) *Attorney, Agent, or Firm* — Kinney & Lange, P. A.

(57) ABSTRACT

A plural material dispensing system (10) includes a pump (38) having a cylinder (52) mounted between a first bracket (32) and a second bracket (34), a piston (54) disposed within the cylinder (52), and a pump rod (48) extending from the piston (54) and out of the first bracket (32). Material is provided to the cylinder (52) through a flow path extending through the pump rod (48). The piston (54) drives material downstream out of the cylinder (52), and the interface between the piston (54) and the inner surface of the cylinder (52) provides a dynamic seal during pumping. The flow of material into and out of the pump (38) is controlled by actively-controlled inlet and outlet valves.

20 Claims, 20 Drawing Sheets

(58) Field of Classification Search
CPC .......... F04B 13/02; F04B 15/02; F04B 23/06; F04B 53/144
See application file for complete search history.

(56) References Cited

U.S. PATENT DOCUMENTS

| | | |
|---|---|---|
| 6,024,254 A | 2/2000 | Oberschelp |
| 6,394,314 B1 | 5/2002 | Sawhney et al. |

FOREIGN PATENT DOCUMENTS

| | | |
|---|---|---|
| CN | 201977675 U | 9/2011 |
| EP | 2792421 A1 | 10/2014 |
| KR | 20100004454 A | 1/2010 |
| UA | 106760 C2 | 10/2014 |
| WO | WO9851405 A1 | 11/1998 |

OTHER PUBLICATIONS

Extended European Search Report for EP Application No. 18941555.7, dated May 2, 2022, pp. 7.
International Search Report and Written Opinion for PCT Application No. PCT/CN2018/118162, dated Aug. 30, 2019, pp. 11.

* cited by examiner

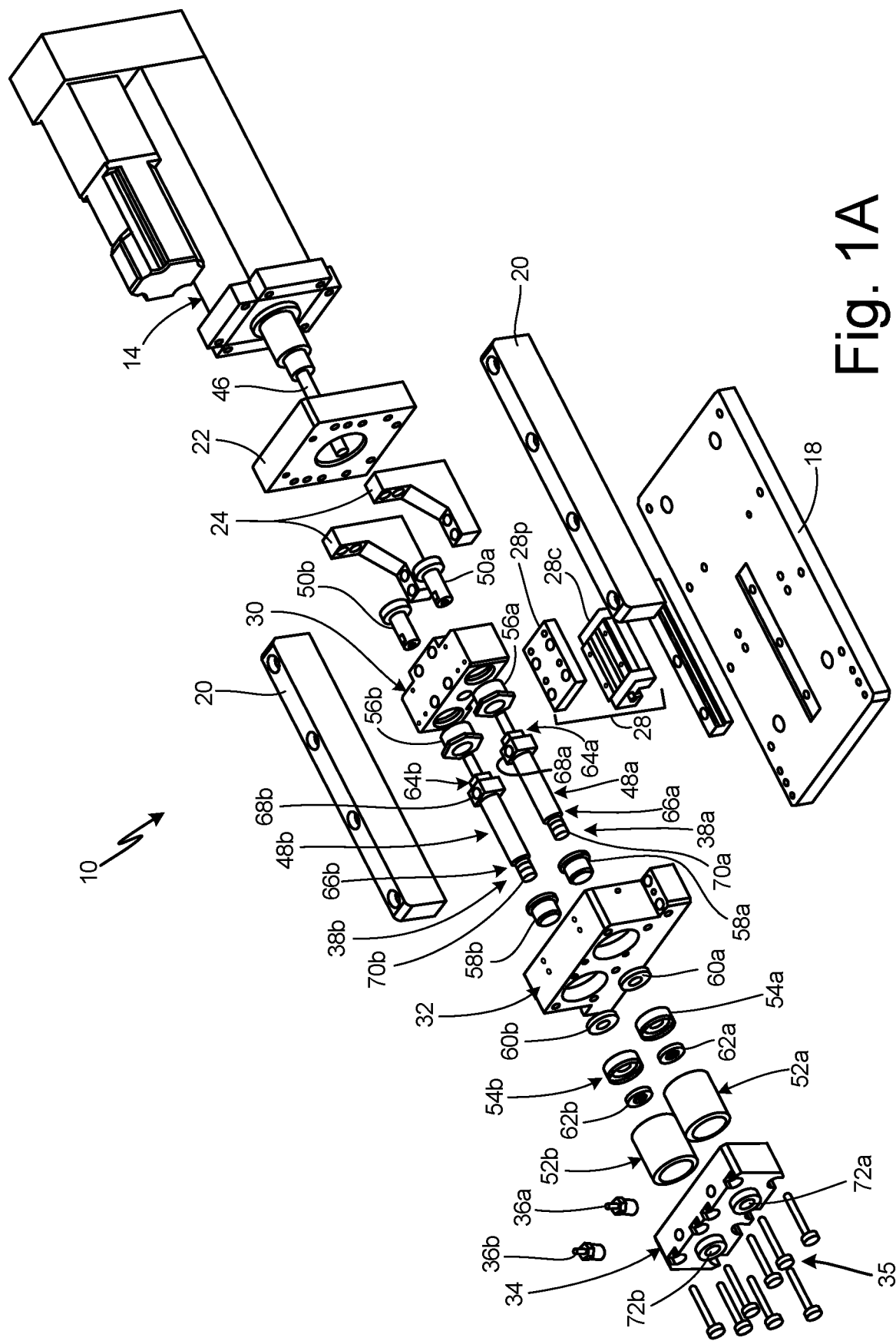

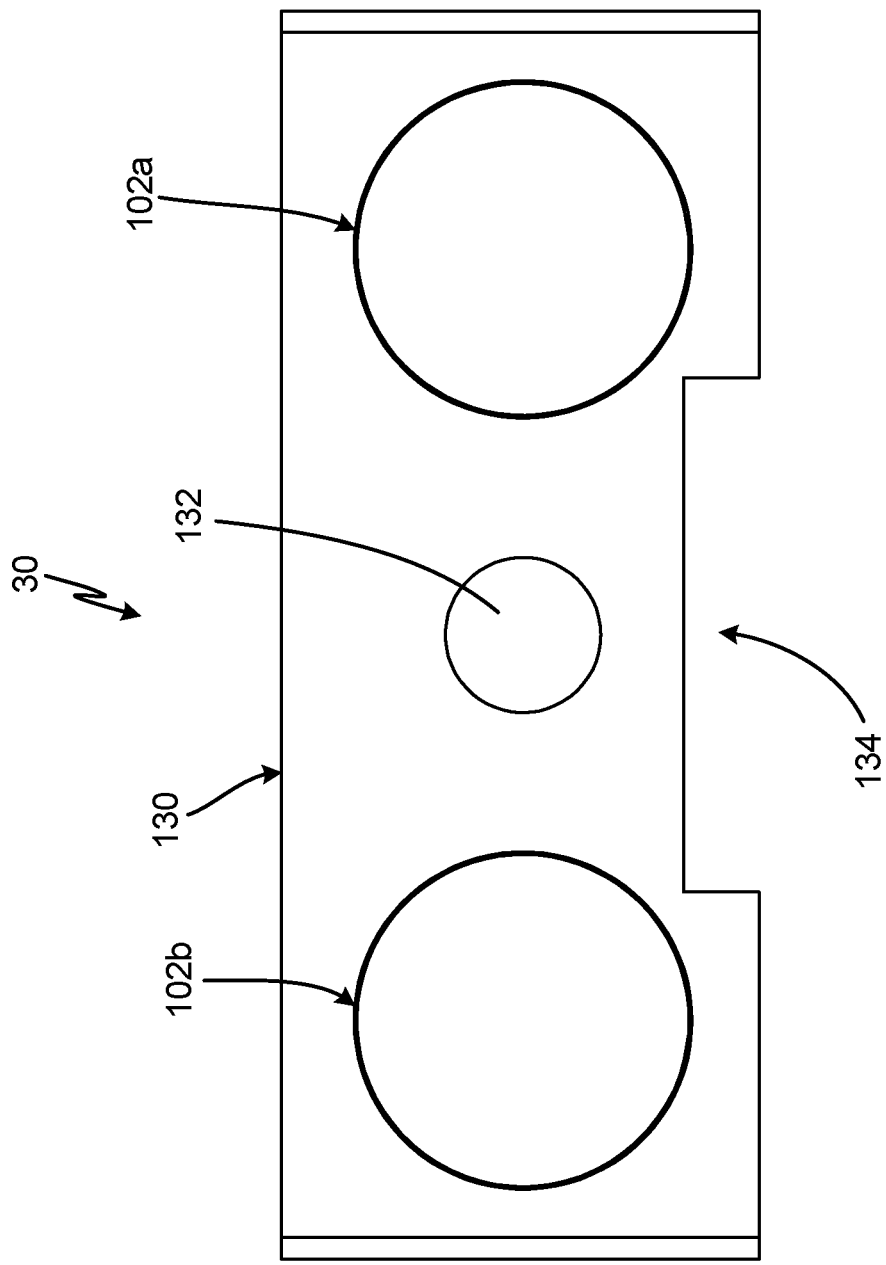

PLURAL MATERIAL DISPENSING SYSTEM

BACKGROUND

This disclosure relates generally metering systems. More particularly, this disclosure relates to plural component metering systems.

Plural component materials are formed by two or more constituent materials combining to form the plural component material. The constituent materials are individually pumped and are typically combined immediately prior to application. One type of plural component material are thermal interface materials (TIMs). TIMs are configured to be inserted between two parts to enhance thermal coupling between the two components. For example, TIMs are often applied in electronics to dissipate heat in the electronic device. TIMs typically include a high concentration of abrasive materials, such as metals, to enhance the conductivity of the material.

When pumping the constituent materials, a piston rod is typically driven into and out of a pumping chamber. On the dispense stroke, the rod is typically driven past an inlet, such that the exterior of the rod is wetted by the material. On the refill stroke, a vacuum condition is created as the rod is withdrawn, and the vacuum draws material into the pumping chamber after the rod is withdrawn past the inlet. In some examples, the material cures when exposed to air, which can occur on the wetted rod when it is withdrawn during the refill stroke. The material curing on the rod creates and abrasive condition that causes significant wear on seals and other components of the pump.

SUMMARY

According to an aspect of the disclosure, a plural material dispensing system includes a motor, a slide bracket connected to and configured to be driven by the motor, a first pump rod mounted to the slide bracket and extending into a first cylinder, a first piston mounted on the end of the first pump rod disposed within the first cylinder, a second pump rod mounted to the slide bracket and extending into a second cylinder, and a second piston mounted on the end of the second pump rod disposed within the second cylinder. The first pump rod includes a first fluid inlet extending into the first pump rod, a first fluid outlet extending through an end of the first pump rod disposed within the first cylinder, and a first flow path extending through the first pump rod between the first fluid inlet and the first fluid outlet. The second pump rod includes a second fluid inlet extending into the second pump rod, a second fluid outlet extending through an end of the second pump rod disposed within the second cylinder, and a second flow path extending through the second pump rod between the second fluid inlet and the second fluid outlet. The slide bracket is configured to drive the first pump rod, first piston, second pump rod, and second piston in a first direction during a dispense stroke and a second direction during a refill stroke.

According to another aspect of the disclosure, a pump includes a slide bracket configured to move longitudinally in a first downstream direction and a second upstream direction; a first bracket spaced from the slide bracket, a second bracket spaced from the first bracket, a cylinder having a first cylinder end and a second cylinder end and retained between the first bracket and the second bracket, a pump rod connected to the slide bracket and extending into the first bracket, and a piston mounted on the rod and disposed within the cylinder. The first bracket includes a rod bore extending into an upstream side of the first bracket and a cylinder bore extending into a downstream side of the first bracket. The second bracket includes an inlet side and an outlet side, a material inlet disposed in the inlet side, a material outlet disposed in the outlet side, and a material flowpath extending between the material inlet and the material outlet. The first rod extends into the first bracket through the rod bore. The first rod includes a first rod end disposed proximate the slide bracket, a second rod end disposed at an opposite end of a rod body from the first rod end, the second rod end including a fluid outlet extending into the second rod end, and a flow path extending through the rod body between a fluid inlet extending into the rod body and the fluid outlet. The piston includes an upstream side and a downstream side. The material is configured to flow through the pump rod and enter the cylinder through the fluid outlet in the first rod end, and wherein the piston is configured to drive the material from the cylinder into the second bracket through the material inlet.

According to yet another aspect of the disclosure, a method of dispensing includes initiating a reload cycle, shifting an inlet valve to a closed state, and initiating a dispense cycle. The reload cycle includes shifting an inlet valve to an open state and an outlet valve to a closed state; activating a motor to cause the motor to draw a pump rod in an upstream direction, the pump rod extending into a pump cylinder through a first bracket, and a piston mounted on an end of the pump rod extending into the pump cylinder; driving material into the pump rod through a pump rod inlet; and refilling the pump cylinder with material flowing through the pump rod from the pump rod inlet to a pump rod outlet. The dispense cycle includes shifting the outlet valve to an open state; and activating the motor to cause the motor to drive the pump rod in a downstream direction, the pump rod driving the piston through the pump cylinder, and the piston driving the material out of the pump cylinder through a second bracket supporting an end of the pump cylinder.

BRIEF DESCRIPTION OF THE DRAWINGS

FIG. 1A is an exploded view of a dispensing system.
FIG. 3B is a front elevation view of a slide bracket.

DETAILED DESCRIPTION

Figure 1B:
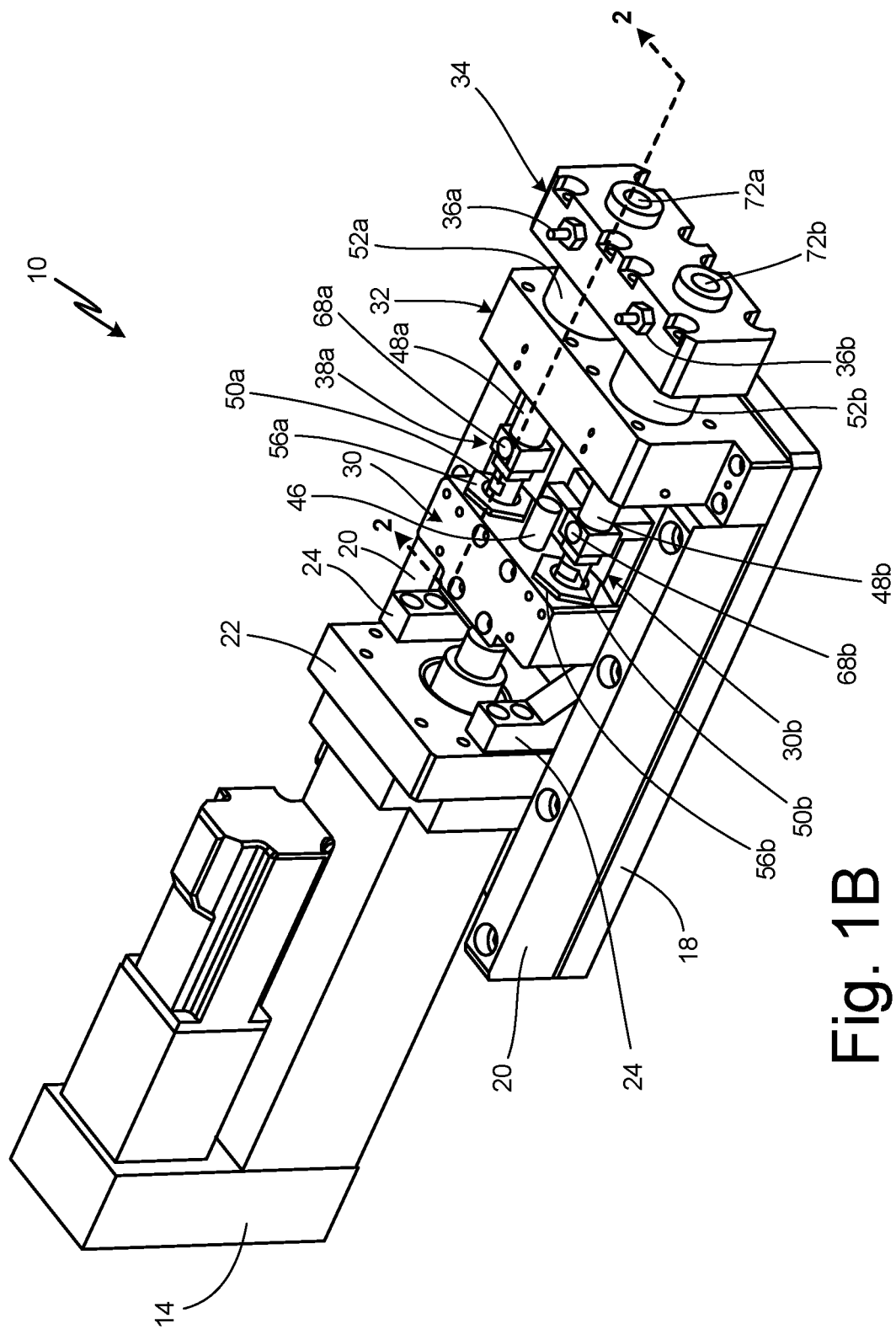
FIG. 1B is an isometric view of a dispensing system.
Figure 1C:
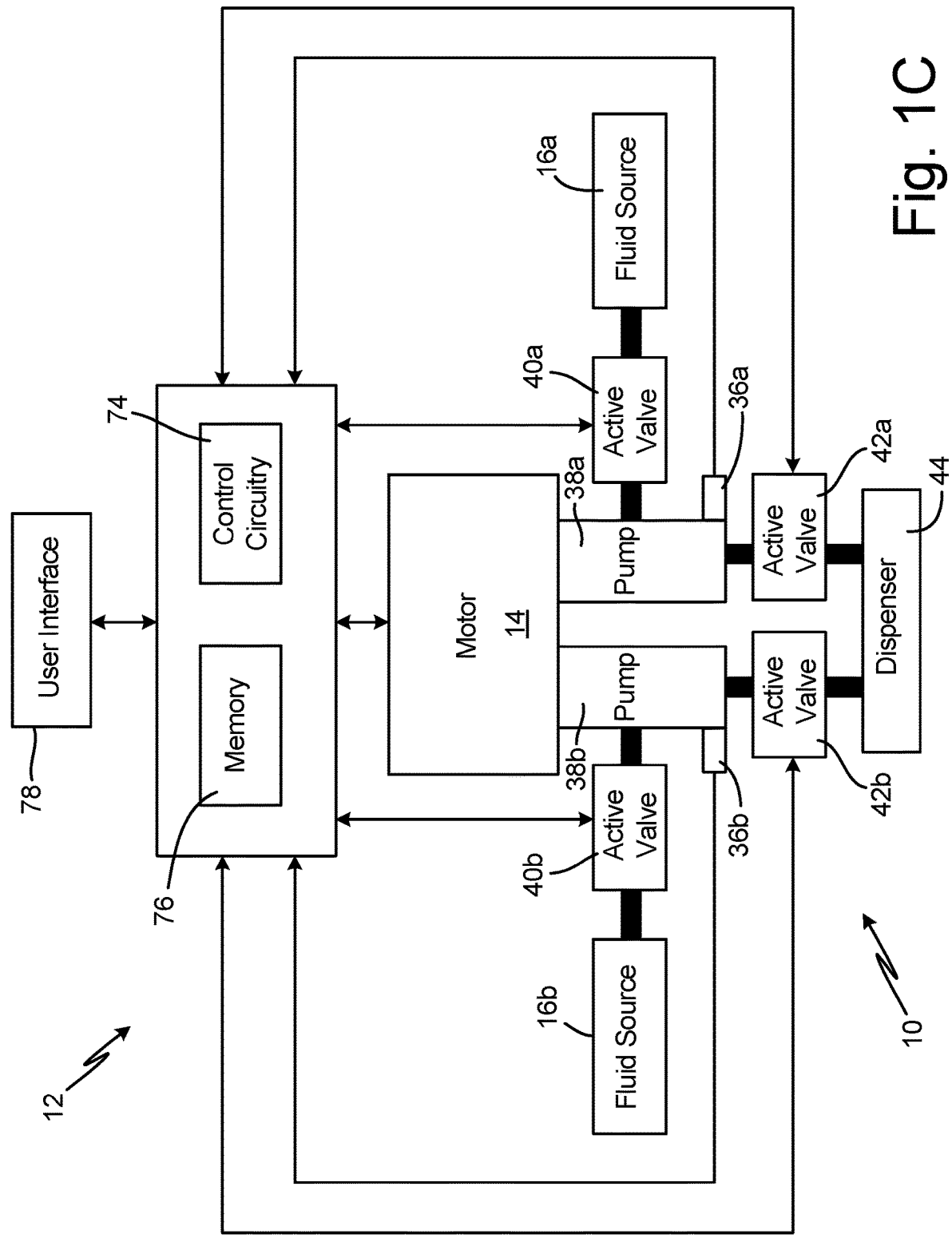
FIG. 1C is a block diagram of a control system for a dispensing system.

FIG. 1A is an exploded view of dispensing system 10. FIG. 1B is an isometric view of dispensing system 10. FIG. 1C is a block diagram of system controller 12 and dispensing system 10. FIGS. 1A-1C will be discussed together. Dispensing system 10 includes motor 14, fluid sources 16a, 16b (FIG. 1C), base plate 18, side rails 20, motor support plate 22, motor support brackets 24, slide rail 26 (FIG. 1B), slide block 28 (FIG. 1B), slide bracket 30, first cylinder bracket 32, second cylinder bracket 34, transducers 36a, 36b; pumps 38a, 38b; inlet valves 40a, 40b (FIG. 1C); outlet valves 42a, 42b (FIG. 1C); and dispenser 44 (FIG. 1C). Motor 14 includes drive arm 46. Slide block 28 includes carriage 28c and plate 28p. Each of pump 38a and pump 38b include, respectively, rods 48a, 48b (FIGS. 1A-1B); floating nuts 50a, 50b (FIGS. 1A-1B); cylinders 52a, 52b (FIGS. 1A-1B); pistons 54a, 54b (FIG. 1A); slide nuts 56a, 56b (FIG. 1A-1B); rod bushings 58a, 58b (FIG. 1A); o-rings 60a, 60b (FIG. 1A); and piston nuts 62a, 62b (FIG. 1A). Each of rod 48a and rod 48b include, respectively, first ends 64a, 64b (FIG. 1A); second ends 66a, 66b (FIG. 1A); rod inlets 68a, 68b (FIGS. 1A-1B); and rod outlets 70a, 70b (FIG. 1A). Second cylinder bracket 34 includes material outlets 72a, 72b. System controller 12 includes control circuitry 74 (FIG. 1C), memory 76 (FIG. 1C), and user interface 78 (FIG. 1C).

Dispensing system 10 is a system for receiving, pressurizing, and metering dispenses of material. In some examples, each of pump 38a and pump 38b dispense different materials that combine at dispenser 44 to form a plural component material. For example, pump 38a can pump a first component material of the plural component material, and pump 38b can pump a second component of the plural component material. The first and second components combine to form the plural component material prior to application. In some examples, the plural component material is a thermal interface material ("TIM") configured to be inserted between two parts to enhance thermal coupling between the two components. For example, TIMs are often applied in electronics to dissipate heat in the electronic device.

Base plate 18 is configured to support the other components of dispensing system 10. Motor 14 is disposed on base plate 18. Motor 14 is configured to simultaneously drive pumps 38a, 38b through both dispense strokes and reload strokes. Motor 14 can be of any desired configuration for driving pumps 38a, 38b. For example, motor 14 can be a servomotor providing either a rotary or linear output.

Motor support plate 22 is attached to a front of motor 14. Drive arm 46 extends from motor 14 through motor support plate 22. Motor support brackets 24 are connected to base plate 18 and to motor support plate 22, and motor support brackets 24 support motor 14 on base plate 18. Side rails 20 are mounted on base plate 18 and bracket other components of dispensing system 10. In some examples, a housing can be attached to side rails 20 to enclose the components of dispensing system 10 disposed between side rails 20.

Slide rail 26 is disposed on base plate 18. Slide block 28 is mounted on slide rail 26 and is configured to slide along slide rail 26. Slide bracket 30 is mounted on slide block 28. Slide rail 26 provides extending along drive axis D-D, and slide rail 26 aligns the movement of slide bracket 30 along drive axis D-D. Slide rail 26 thereby ensures proper alignment between motor 14 and pumps 38a, 38b, thereby preventing undesired torqueing that can occur due to misalignment. As shown, slide block 28 includes carriage 28c that rides on slide rail 26 and plate 28p mounted on carriage 28c and connected to slide bracket 30. While slide block 28 is shown as including carriage 28c and plate 28p, it is understood that slide block 28 can be of any suitable configuration for connecting slide bracket 30 to slide rail 26 and facilitating linear movement of slide bracket 30 along slide rail 26. The connection of slide block 28 and slide rail 26 ensures smooth axial movement of slide bracket 30, thereby ensuring a steady output from pumps 38a, 38b and providing increased accuracy for the shot size generated by pumps 38a, 38b.

Drive arm 46 extends into slide bracket 30 and is operatively connected to slide bracket 30. Drive arm 46 is configured to push slide bracket 30 in a first, forward direction, towards first cylinder bracket 32 and second cylinder bracket 34, during a dispense stroke, and is configured to pull slide bracket 30 in a second, reverse direction, away from first cylinder bracket 32 and second cylinder bracket 34, during a reload stroke. Drive arm 46 can be connected to slide bracket 30 in any desired manner. In some examples, motor 14 is a rotary output motor. In such an example, drive arm 46 can include threading interfacing with threading in slide bracket 30 such that rotation of drive arm 46 drives slide bracket 30. In other examples, motor 14 is a linear output motor. In such an example, drive arm 46 is attached to slide bracket 30, such as by a clamp, nut, or any other suitable connecting device, and linear movement of drive arm 46 displaces slide bracket 30.

Floating nuts 50a, 50b are partially disposed in and extend from slide bracket 30. Slide nuts 56a, 56b are connected to slide bracket 30 and retain a portion of floating nuts 50a, 50b in slide bracket 30. Floating nuts 50a, 50b are connected to first ends 64a, 64b of rods 48a, 48b and are configured to transmit driving forces to rods 48a, 48b from slide bracket 30.

Rods 48a, 48b extend from floating nuts 50a, 50b, through first cylinder bracket 32, into cylinders 52a, 52b. Second ends 66a, 66b of rods 48a, 48b are disposed in cylinders 52a, 52b. Rod bushings 58a, 58b are disposed in first cylinder bracket 32, and rods 48a, 48b extend through rod bushings 58a, 58b. Rod bushings 58a, 58b form bushings for rods 48a, 48b to slide within during operation.

Rod inlets 68a, 68b extend into rods 48a, 48b and provide an opening for the component materials to enter rods 48a, 48b from fluid sources 16. Rod outlets 70a, 70b are disposed at second ends 66a, 66b of rods 48a, 48b, and rod outlets 70a, 70b are configured to output the component material from rods 48a, 48b into cylinders 52a, 52b. Pistons 54a, 54b are disposed on second ends 66a, 66b of rods 48a, 48b. Piston nuts 62a, 62b are connected to second ends 66a, 66b and retain pistons 54a, 54b on rods 48a, 48b. Rod outlets 70a, 70b provide the material to cylinders 52a, 52b downstream of pistons 54a, 54b. O-rings 60a, 60b are disposed on second ends 66a, 66b of rods 48a, 48b and interface with upstream sides of pistons 54a, 54b. Piston nuts 62a, 62b are connected to second ends 66a, 66b of rods 48a, 48b and secure pistons 54a, 54b on rods 48a, 48b.

First cylinder bracket 32 is mounted on base plate 18. Cylinders 52a, 52b extend between and are supported by first cylinder bracket 32 and second cylinder bracket 34. Fasteners 35 extend through second cylinder bracket 34 and into first cylinder bracket 32. Fasteners 35 secure second cylinder bracket 34 to first cylinder bracket 32 and clamp cylinders 52a, 52b between second cylinder bracket 34 and first cylinder bracket 32. Material outlets 72a, 72b extend into second cylinder bracket 34 and provide openings for the material to flow downstream from second cylinder bracket 34. Hoses or other receiving devices are configured to connect to material outlets 72a, 72b to receive the material exiting material outlets 72a, 72b. Transducers 36a, 36b extend into second cylinder bracket 34 and are configured to sense the fluid pressure of the material within second cylinder bracket 34.

As shown in FIG. 1C, fluid sources 16 are disposed upstream of pumps 38a, 38b. Fluid sources 16 are configured to store materials prior to application. In some examples, fluid source 16a can store a first component material of a plural component material and fluid source 16b can store a second, different component material of the plural component material. In other examples, fluid source 16a and fluid source 16b can store the same material, such as grease or another lubricant. Fluid sources 16 are configured to be pressurized, such that the pressure within fluid sources 16 drives material into pumps 38a, 38b. In one example, fluid sources 16 can be pressurized cylinders mounted to rod inlets 68a, 68b. In another example, fluid sources 16 can include a device to mechanically pressurize the material, such as a spring-biased plate or a motor driven plunger.

Inlet valves 40a, 40b are disposed between fluid sources 16 and pumps 38a, 38b to control the flow of material to pumps 38a, 38b. In some examples, inlet valves 40a, 40b are connected to rod inlets 68a, 68b. Inlet valves 40a, 40b are configured to control the flow of material into rods 48a, 48b. Outlet valves 42a, 42b are disposed downstream of pumps 38a, 38b and are configured to control the flow of material out of pumps 38a, 38b. In some examples, outlet valves 42a, 42b are mounted at material outlet 72a, 72b of second cylinder bracket 34. For example, the housings of outlet valves 42a, 42b can be connected to material outlets 72a, 72b by interfaced threading.

In some examples, inlet valves 40a, 40b and outlet valves 42a, 42b are active valves. Active valves are actively controlled between an open state, where material can flow through the valve, and a closed state, where material is prevented from flowing through the valve. For example, inlet valves 40a, 40b and outlet valves 42a, 42b can be electrically controlled between the open state and the closed state. Inlet valves 40a, 40b and outlet valves 42a, 42b can be of any desired configuration capable of being actively controlled between the open state and the closed state, such as a needle valve, ball valve, diaphragm valve, disk valve, lift valve, or any other suitable configuration. Dispenser 44 is disposed downstream of outlet valves 42a, 42b and is configured to receive pumped material from outlet valves 42a, 42b. In some examples, the first component material and second component material mix at dispenser 44 to form the plural component material, and dispenser 44 applies the plural component material at a desired location.

System controller 12 is configured to monitor and control dispenses by dispensing system 10. It is understood that system controller 12 can be of any suitable configuration for controlling the fill and dispense cycles of pumps 38a, 38b, gathering data, processing data, etc. In some examples, system controller 12 can be implemented as a plurality of discrete circuitry subassemblies. In one example, control circuitry 74 is configured to implement functionality and/or process instructions. For instance, control circuitry 74 can be capable of processing instructions stored in memory 76. Examples of control circuitry 74 can include any one or more of a microprocessor, a controller, a digital signal processor (DSP), an application specific integrated circuit (ASIC), a field-programmable gate array (FPGA), or other equivalent discrete or integrated logic circuitry.

Memory 76, in some examples, can be configured to store information during operation. Memory 76, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 76 is a temporary memory, meaning that a primary purpose of memory 76 is not long-term storage. Memory 76, in some examples, is described as volatile memory, meaning that memory 76 does not maintain stored contents when power is turned off. Examples of volatile memories can include random access memories (RAM), dynamic random access memories (DRAM), static random access memories (SRAM), and other forms of volatile memories. In some examples, memory 76 is used to store program instructions for execution by control circuitry 74. Memory 76, in one example, is used by software or applications running on system controller 12 to temporarily store information during program execution.

Memory 76, in some examples, also includes one or more non-volatile computer-readable storage media. Memory 76 can be configured to store larger amounts of information than volatile memory. Memory 76 can further be configured for long-term storage of information. In some examples, memory 76 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 78, such as a keyboard, touchscreen, monitor, mouse, smartphone, tablet, or other suitable interface device, allows a user to interact with dispensing system 10, such as by retrieving information from memory 76, receiving notifications, initiating the software stored in memory 76, and inputting additional information to memory 76, among other examples. User interface 78 can be integrated into system controller 12 or can be a device separate from system controller 12, such as a smartphone or tablet.

Each of pump 38a and pump 38b drive the respective component materials downstream to dispenser 44 at a common pressure. While dispensing system 10 is shown as including two pumps 38a, 38b, it is understood that dispensing system 10 can include as many or as few pumps 38a, 38b as desired, such as one, three, four, or more pumps 38a, 38b. The number of pumps 38a, 38b can depend on any number of factors, such as the number of constituent materials in the plural component material, the mixing ratio of the constituent materials, and/or the desired downstream displacement. For example, dispensing system 38a, 38b can include three pumps 38a, 38b where the plural component material is comprised of three constituent materials. In other examples, two of the three pumps 38a, 38b can pump the same constituent material where the plural component material requires a 2:1 mixing ratio. The user can also utilize multiple pumps 38a, 38b driving the same material to generate a larger downstream displacement as compared to a single pump. The common pressure between each pump 38a, 38b ensures proper mixing of the component materials in dispenser 44. The user can set the desired application pressure and the desired shot size to be expelled by dispenser 44 via user interface 78.

Prior to a dispense cycle, controller 12 can control pre-pressurization of pumps 38a, 38b. Controller 12 causes motor 14 to drive slide bracket 30, and thus rods 48a, 48b and pistons 54a, 54b, in the forward direction to increase the fluid pressure within cylinders 52a, 52b. Transducer 36a provides fluid pressure information regarding the material in cylinder 52a to controller 12. Transducer 36b provides fluid pressure information regarding the material in cylinder 52b to controller 12. Pressurizing the component material prior to driving the component material downstream to dispenser 44 provides greater shot accuracy, which is the volume of material actually output at dispenser 44 as compared to the desired output volume, and further ensures proper mixing of the component materials in dispenser 44.

During a dispense cycle, controller 12 activates motor 14 and causes motor 14 to drive slide bracket 30 in the forward direction. Slide bracket 30 drives rods 48a, 48b and rods 48a, 48b drive pistons 54a, 54b within cylinders 52a, 52b. Controller 12 provides an open command to outlet valves 42a, 42b to cause outlet valves 42a, 42b to shift to the open state. Motor 14 continues driving slide bracket 30, and thus rods 48a, 48b and pistons 54a, 54b, in the forward direction. Pistons 54a, 54b drive the component materials disposed within cylinders 52a, 52b downstream out of second cylinder bracket 34 through material outlets 72a, 72b and through outlet valves 42a, 42b. The component materials flow through outlet valves 42a, 42b to dispenser 44, where the multiple component materials mix to form the plural component material and are applied by dispenser 44. After the dispense stroke is complete, controller 12 deactivates motor 14 and provides a close command to outlet valves 42a, 42b. The close command causes outlet valves 42a, 42b to enter the closed state.

After the dispense cycle is complete, dispensing system 10 proceeds through a reload cycle to reset for the next dispense cycle. Controller 12 provides an open command to inlet valves 40a, 40b to cause inlet valves 40a, 40b to enter the open state. With inlet valves 40a, 40b in the open state, controller 12 causes motor 14 to activate and pull slide bracket 30 in the reverse direction. Slide bracket 30 pulls rods 48a, 48b in the reverse direction, and rods 48a, 48b pull pistons 54a, 54b in the reverse direction. The upstream pressure within fluid sources 16 causes the component materials to enter rods 48a, 48b through rod inlets 68a, 68b. The component material continues to flow through rod 48a, 48b and fill cylinders 52a, 52b until the end of the reload stroke. At the end of the reload stroke, controller 12 provides a close command to inlet valves 40a, 40b, causing inlet valves 40a, 40b to shift to the closed state. Both inlet valves 40a, 40b and outlet valves 42a, 42b are thus in the closed state. With both inlet valves 40a, 40b and outlet valves 42a, 42b in the closed state, controller 12 can cause motor 14 to drive rods 48a, 48b in the forward direction to pre-pressurize the material in pump 38a, 38b. Pump 38a, 38b is thus primed for another dispense cycle.

Figure 2A:
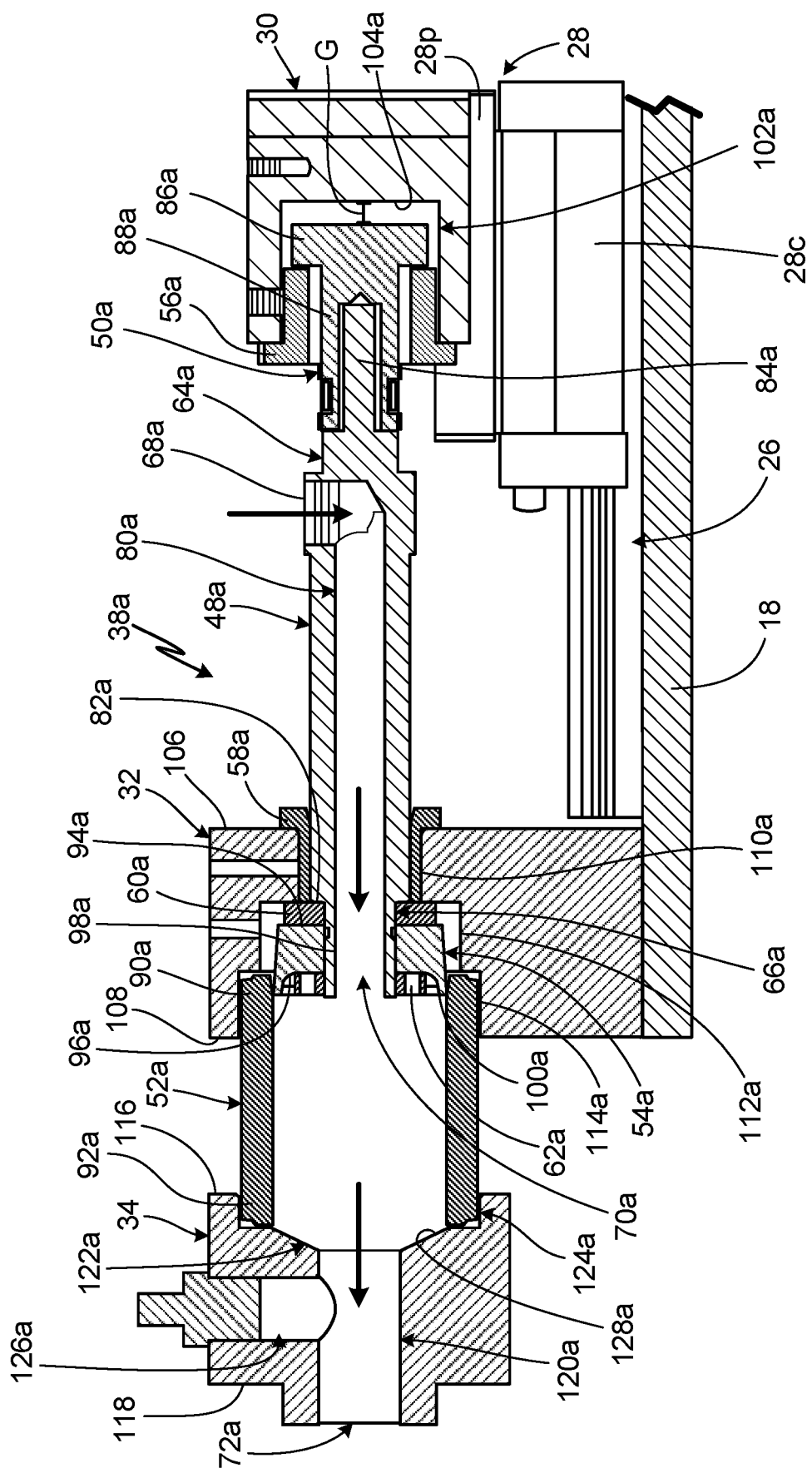
FIG. 2A is a cross-sectional view of the metering system of FIG. 1A taken along line 2-2 in FIG. 1A, showing the dispensing system in a first state.
Figure 2B:
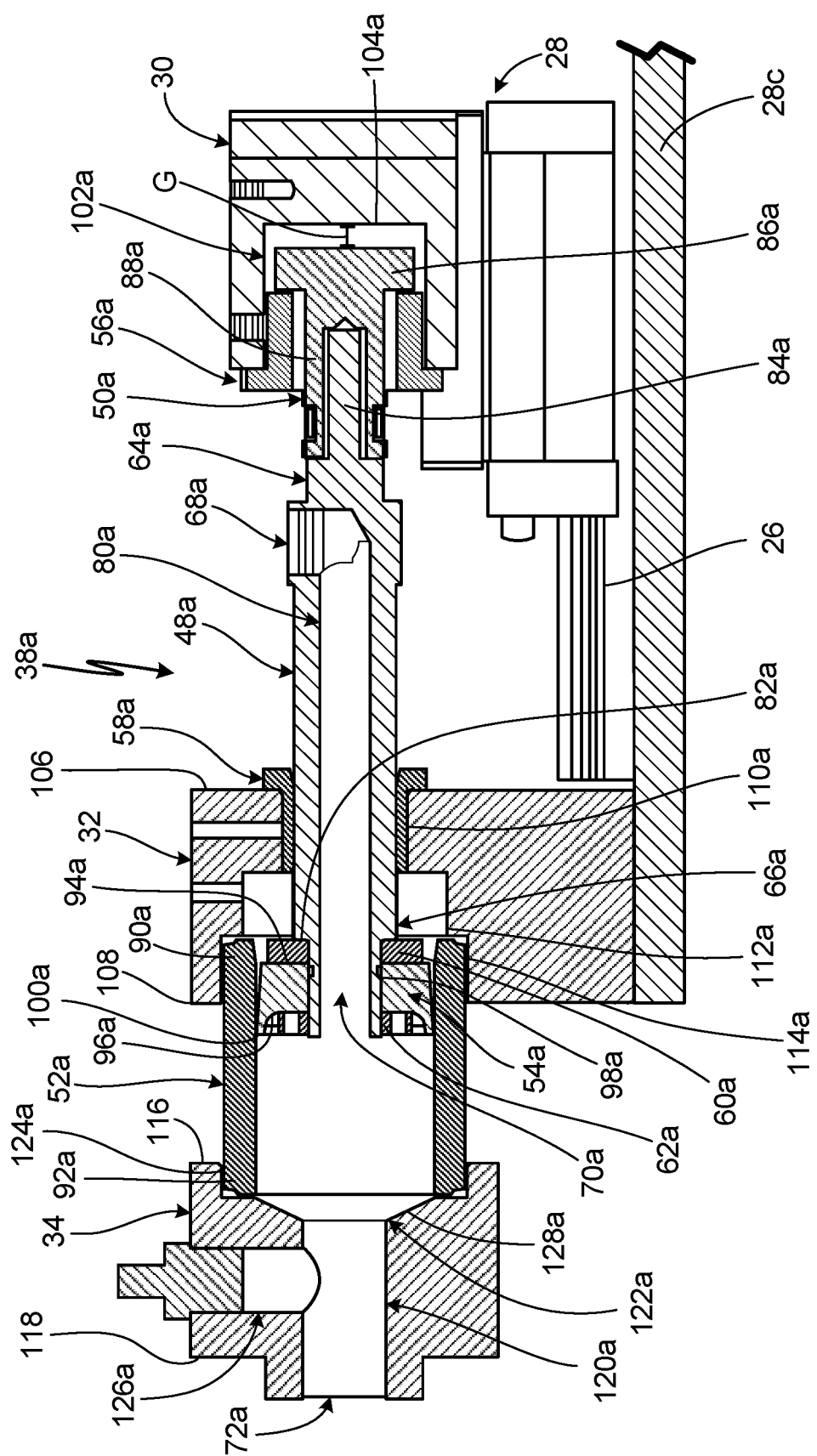
FIG. 2B is a cross-sectional view of the metering system of FIG. 1A taken along line 2-2 in FIG. 1A, showing the dispensing system in a second state.
Figure 2C:
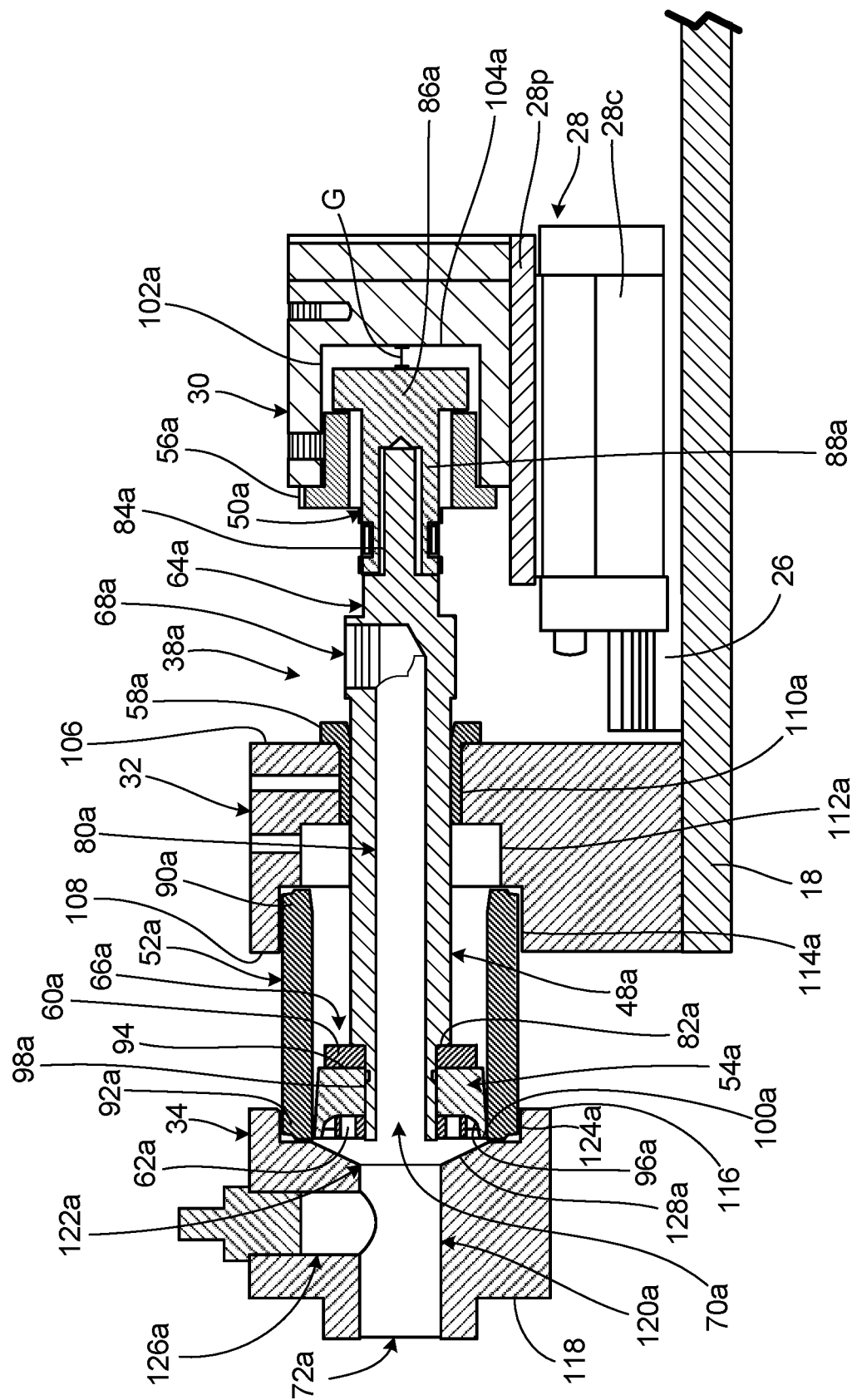
FIG. 2C is a cross-sectional view of the metering system of FIG. 1C taken along line 2-2 in FIG. 1A showing the dispensing system in a third state.

FIG. 2A is a cross-sectional view of dispensing system 10 taken along line 2-2 in FIG. 1A showing pump 38a in a retracted state. FIG. 2B is a cross-sectional view of dispensing system 10 taken along line 2-2 in FIG. 1A showing pump 38a in an intermediate state. FIG. 2C is a cross-sectional view of dispensing system 10 taken along line 2-2 in FIG. 1A showing pump 38a in a deployed state. While pump 38a is illustrated, it is understood that pump 38b is substantially similar to, and in some examples identical to, pump 38a. Base plate 18, slide rail 26, slide block 28, slide bracket 30, first cylinder bracket 32, second cylinder bracket 34, and pump 38a of dispensing system 10 are shown. Pump 38a includes rod 48a, floating nut 50a, cylinder 52a, piston 54a, slide nut 56a, rod bushing 58a, o-ring 60a, and piston nut 62a. Rod 48a includes first rod end 64a, second rod end 66a, rod inlet 68a, rod outlet 70a, rod passage 80a, shoulder 82a, and projection 84a. Floating nut 50a includes head 86a and shaft 88a. Cylinder 52a includes first cylinder end 90a and second cylinder end 92a. Piston 54a includes upstream end 94a, downstream end 96a, and central bore 98a. Downstream end 96a includes lip 100a. Slide bracket 30 includes chamber 102a, which includes back wall 104a. First cylinder bracket 32 includes motor side 106, cylinder side 108, rod bore 110a, piston bore 112a, and cylinder bore 114a. Second cylinder bracket 34 includes material outlet 72a, inlet side 116, outlet side 118, material passage 120a, material inlet 122a, cylinder groove 124a, and pressure port 126a. Material inlet 122a includes sloped edge 128a.

Slide bracket 30 is mounted on slide block 28 and configured to be driven in the forward and reveres directions along slide block 28 by motor 14 (FIGS. 1A-1C). Floating nut 50a is partially disposed within chamber 102a of slide bracket 30. Head 86a of floating nut 50a is retained in chamber 102a by slide nut 56a. Slide nut 56a is connected within chamber 102a in any desired manner, such as interfaced threading on slide nut 56a and chamber 102a. Shaft 88a extends from head 86a through slide nut 56a and projects out of chamber 102a. Shaft 88a is connected to projection 84a of rod 48a. Shaft 88a can be connected to projection 84a in any desired manner, such as by interfaced threading on shaft 88a and projection 84a.

Gap G is disposed between back wall 104a of chamber 102a and head 86a. Gap G allows the pressure forces to be balanced between pump 38a and pump 38b (FIGS. 1A-1C). The position of floating nut 50a on projection 84a can be adjusted to change the size of gap G. Varying the size of gap G between multiple pumps 38a, 38b allows back wall 104a to impact head 86a of floating nut 50a prior to impacting the head of a second floating nut, such as floating nut 50b (FIGS. 1A-1B). By impacting the head 86a of floating nut 50a prior to impacting the head of second floating nut 50b, dispensing system 10 begins to build pressure in the pump 38a prior to building pressure in pump 38b. This allows for balanced pressures between the two pumps, such as when the material being driven by one pump is more compressible than the material being driven by the other pump. Balancing the pressures ensures proper mixing in the downstream dispenser, such as dispenser 44 (FIG. 1C).

Projection 84a extends from first end 64a of rod 48a. Rod 48a extends into first cylinder bracket 32 through rod bore 110a. Rod bushing 58a is disposed in rod bore 110a and extends around rod 48a. In some examples, rod bushing 58a is a bushing that provides a surface for rod 48a to slide along during operation. Rod inlet 68a extends into rod 48a and provides a flowpath for material to enter rod passage 80a. Rod passage 80a extends through rod 48a between rod inlet 68a and rod outlet 70a.

First cylinder bracket 32 is disposed on base plate. Rod bore 110a extends into motor side 106 of first cylinder bracket 32. Cylinder bore 114a extends into cylinder side 108 of first cylinder bracket 32, and cylinder bore 114a is disposed coaxially with rod bore 110a. Piston bore 112a is disposed within first cylinder bracket 32 between cylinder bore 114a and rod bore 110a.

Cylinder 52a extends between and is supported by first cylinder bracket 32 and second cylinder bracket 34. First cylinder end 90a is disposed in cylinder bore 114a of first cylinder bracket 32, and second cylinder end 92a is disposed in cylinder groove 124a of second cylinder bracket 34. Second cylinder bracket 34 is attached to first cylinder bracket 32 by fasteners 35 (FIG. 1B) extending through second cylinder bracket 34 and into cylinder side 108 of first cylinder bracket 32. Fasteners 35 also serve to clamp cylinder 52a between first cylinder bracket 32 and second cylinder bracket 34.

Piston 54a is disposed on second rod end 66a. Second rod end 66a extends through central bore 98a of piston 54a. Upstream end 94a of piston 54a faces first cylinder bracket 32 and downstream end 96a of piston 54a faces second cylinder bracket 34. Lip 100a of piston 54a contacts the inner wall of cylinder 52a and seals against cylinder 52a. O-ring 60a is disposed between piston 54a and shoulder 82a of rod 48a. Piston nut 62a is disposed on second rod end 66a and abuts downstream end 96a of piston 54a. Downstream end 96a of piston is concave. Piston nut 62a is disposed within the concavity of downstream end 96a. Piston nut 62a is configured to retain piston 54a on rod 48a. Piston nut 62a can be connected to second rod end 66a in any desired manner, either permanently, such as by welding, or removably, such as by interfaced threading or a press-fit connection.

Material passage 120a extends through second cylinder bracket 34 between inlet side 116 and outlet side 118. Material outlet 72a extends into outlet side 118. Material inlet 122a extends into inlet side 116. Cylinder groove 124a extends into inlet side 116 and extends circumferentially around material inlet 122a. Pressure port 126a extends though the top of second cylinder bracket 34 and is fluidly connected to material passage 120a. Pressure port 126a is configured to receive any suitable device for sensing the pressure within pump 38a, such as a transducer, such as transducer 36a (FIG. 1C) or transducer 36b (FIG. 1C), or a pressure gauge. Sloped edge 128a extends circumferentially around material inlet 122a and is configured to provide a smooth transition in the flowpath for the material flowing from the interior of cylinder 52a to material passage 120a.

Pump 38a is initially in the fully retracted position shown in FIG. 2A. During a dispense stroke, pump 38a proceeds from the retracted position shown in FIG. 2A to the intermediate position shown in FIG. 2B and ends in the deployed position shown in FIG. 2C. It is understood, however, that depending on the size of the desired dispense, the dispense stroke can end with piston 54a at any position between the retracted position shown in FIG. 2A and the deployed position shown in FIG. 2C.

During the dispense cycle, motor 14 (FIGS. 1A-1C) is activated and begins driving slide bracket 30 in the forward direction. As discussed above, inlet valves 40a, 40b (shown in FIG. 1C) are in the closed state throughout the dispense cycle, preventing any material from backflowing out of rod inlet 68a. As slide bracket 30 moves in the forward direction, gap G decreases until back wall 104a of chamber 102a contacts head 86a of floating nut 50a. Slide bracket 30 exerts a force on floating nut 50a, driving floating nut 50a in the forward direction. Floating nut 50a drives rod 48a, and rod 48a drives piston 54a through cylinder 52a.

In some examples, the material in pump 38a is pre-pressurized prior to the actual dispense. In such an example, the outlet valve, such as outlet valve 42 (FIG. 1C), is in the closed state while slide bracket 30 is initially driven in the forward direction. The sensor mounted in pressure port 126a provides pressure information to the controller, such as controller 12 (FIG. 1C). The controller can deactivate the motor when the fluid pressure reaches the desired pre-dispense level.

During the dispense event, the outlet valve is opened and slide bracket 30 is again driven in the forward direction. Piston 54a drives the material out of cylinder 52a and into second cylinder bracket 34 through material inlet 122a. Lip 100a seals against cylinder 52a and prevent material from leaking past piston 54a as piston travels in the forward direction. In some examples, piston 54a is formed from any suitable material capable of sealing with cylinder 52a and generating the high pressures desired during pumping, which can be up to about 600 psi. For example, piston 54a can be formed from a synthetic polymer, such as nylon, and cylinder 52a can be formed from a metal, such as steel. In some examples, the interface between lip 100a and cylinder 52a is the only dynamic seal within pump 38a. Having the interface between lip 100a and cylinder 52a form the only dynamic seal decreases the wear surfaces within pump 38a, thereby increasing the useful life of pump 38a and reducing downtime due to maintenance. Moreover, the materials of piston 54a and cylinder 52a, such as nylon and steel respectively, are sufficiently durable that pump 38a can proceed through a high number of dispense and reload cycles without requiring part replacement; more than one million dispense and reload cycles, in some cases.

The concave downstream end 96a of piston 54a encourages circulation within the material as piston 54a moves in the forward direction through cylinder 52a. Lip 100a and the concave downstream end 96a of piston 54a scoop the material off of the inner wall of cylinder 52a, generating the circulation. Creating the circulation prevents the material from remaining in the same position in cylinder 52a, thereby preventing the material from sticking in the same location within cylinder 52a for too long of a time period and curing within cylinder 52a, also referred to as "pack out." Sloped edge 128a also prevents pack out as the material enters material inlet 122a. Sloped edge 128a and the concave downstream end 96a eliminate sharp corners within the flowpath of the material. Eliminating sharp corners and providing sloped surfaces in the flow path, such as the concave downstream end 96a and sloped edge 128a, prevents excessive residence times that can lead to pack out and material separation. After the dispense stroke is complete, the outlet valve is shifted to the closed state and the inlet valve is shifted to the open state.

During the reload stroke, slide bracket 30 is pulled in the reverse direction, from the deployed position shown in FIG. 2C, through the intermediate position shown in FIG. 2B, and to the retracted position shown in FIG. 2A. Slide nut 56a contacts head 86a of floating nut 50a and pulls floating nut 50a in the reverse direction. Floating nut 50a pulls rod 48a and piston 54a in the reverse direction. As rod 48a proceeds through the reverse stroke, the pressure upstream of the inlet valve, such as the pressure within fluid source 16 (FIG. 1C), drives the material into rod 48a through rod inlet 68a. A vacuum is not created within cylinder 52a to draw material into pump 38a. Instead, the new material flowing into pump 38a due to the upstream pressure causes the material already residing in pump 38a, such as within rod passage 80a, to fill any void created. As such, the material flowing into rod 48a drives any material in rod passage 80a out of rod outlet 70a and into cylinder 52a. The material that first enters rod 48a is thereby also the material that first exits rod 48*a* and enters cylinder 52*a*. The material that first enters cylinder 52*a* is also the first material that exits cylinder 52*a* and is provided downstream through the outlet valve. Pump 38*a* thereby provides true first-in, first-out pumping.

Pump 38*a* provides significant advantages. The material flows through rod passage 80*a* and is provided to cylinder 52*a* through rod outlet 70*a*. The exterior of rod 48*a* is not exposed to the material being pumped, so the material cannot cure on rod 48*a*, become abrasive, and cause wear to other components of pump 38*a*. In addition, pump 38*a* provides true first-in, first-out pumping of the material, which prevents excessive residence time of the material within pump 38*a*. Pump 38*a* thereby prevents pack out and material separation that can occur due to excessive residence. Moreover, downstream end 96*a* being concave and sloped edge 128*a* creating a sloped edge prevent pack out within pump 38*a* by eliminating sharp corners where the material could cure within cylinder 52*a*. Moreover, pump 38*a* eliminates additional seals that could become worn and require replacement during operation. Lip 100*a* seals against cylinder 52*a* and prevents material from flowing upstream past piston 54*a*. Because the exterior of rod 48*a* is not directly exposed to the material, rod 48*a* does not require seals extending around rod 48*a*, such as within rod bore 110*a*. Pump 38*a* thereby has fewer parts and is more economical to manufacture and to maintain.

Figure 3A:
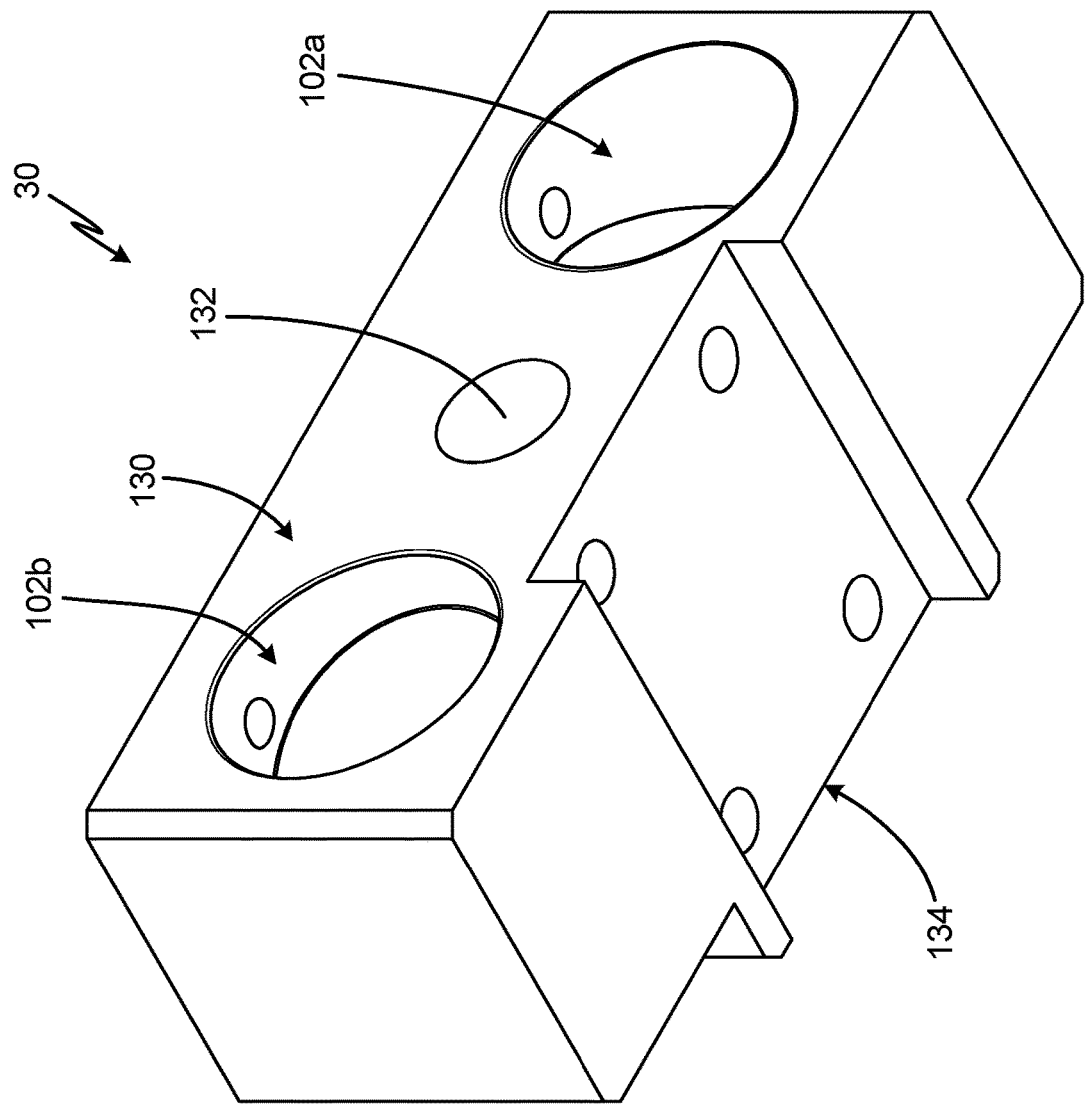
FIG. 3A is an isometric view of a slide bracket.

FIG. 3A is an isometric view of slide bracket 30. FIG. 3B is a front elevation view of slide bracket 30. FIGS. 3A and 3B will be discussed together. Slide bracket 30 includes chamber 102*a*, chamber 102*b*, bracket body 130, and drive arm bore 132. Bracket body 130 includes recess 134.

Slide bracket 30 is configured to receive floating nuts 50*a*, 50*b* (FIGS. 1A-1B) in chambers 102*a*, 102*b*, respectively. Each chamber 102*a*, 102*b* is configured to receive a slide nut, such as slide nuts 56*a*, 56*b* (FIGS. 1A-1B), to retain the floating nuts within chambers 102*a*, 102*b*. For example, each chamber 102*a*, 102*b* can include threading configured to interface with threading on the slide nut. It is understood, however, that the slide nuts can be secured within chambers 102*a*, 102*b* in any suitable manner, such as a bayonet connection, press-fit connection, pinned connection, or any other suitable connection.

Drive arm bore 132 extends through bracket body 130 and is configured to receive the drive arm, such as drive arm 46 (FIGS. 1A and 1B), of the motor, such as motor 14 (FIGS. 1A-1C). Drive arm bore 132 can be a smooth bore, such as where motor 14 is a linear actuator, or can include internal threading configured to interface with threading on the drive arm, such as where motor 14 is a rotary actuator. Recess 134 is disposed on a bottom side of slide bracket 30 and is configured to receive a portion of slide block 28 (FIGS. 1A-1B). Slide block 28 is positioned in recess 134, and fasteners (not shown) can extend through slide block 28 into bracket body 130 to secure slide bracket 30 to slide block 28. Positioning the portion of slide block 28 within recess 134 prevents slide bracket 30 from twisting relative to slide block 28.

Figure 4A:
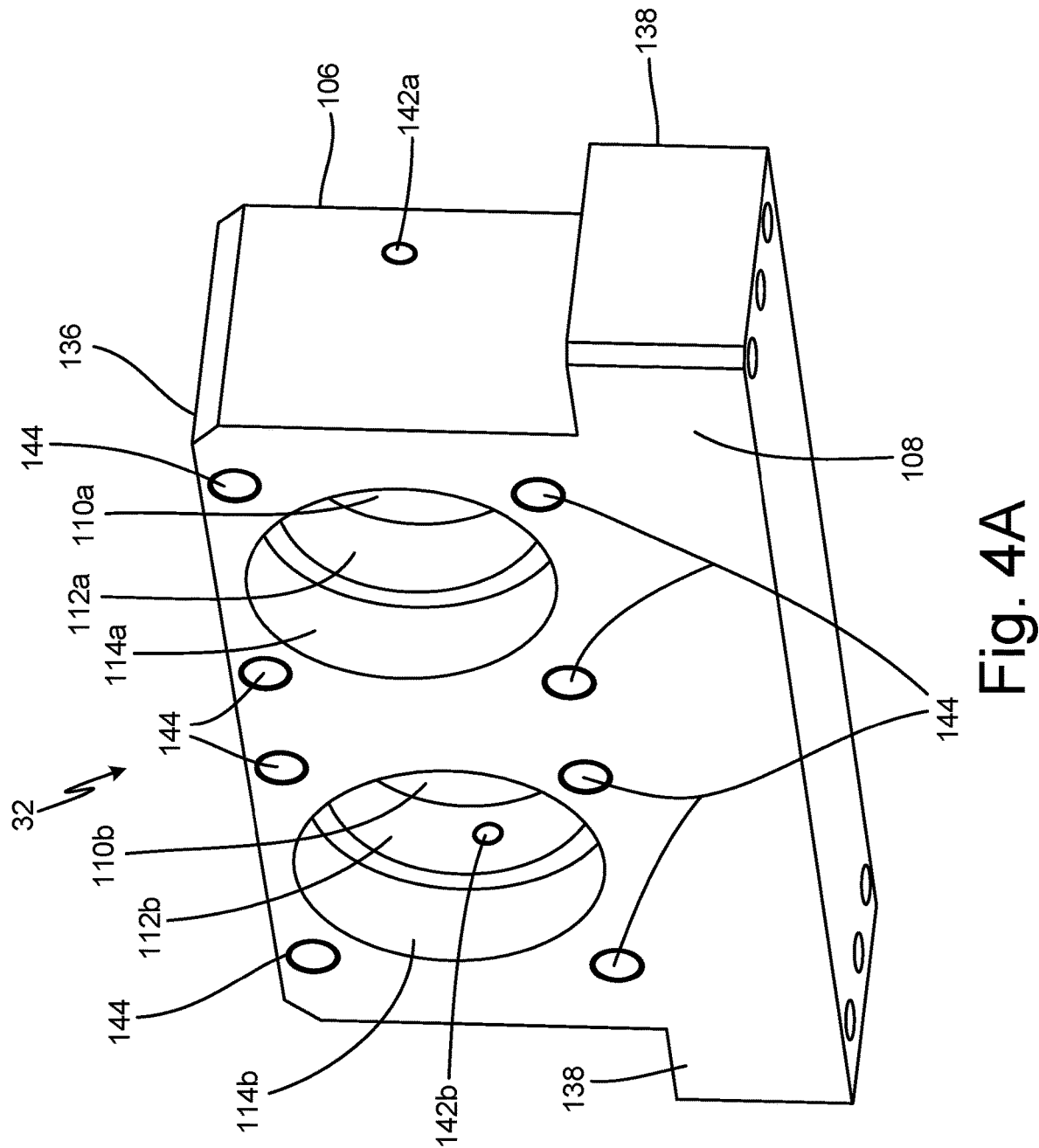
FIG. 4A is an isometric view of a first bracket.
Figure 4B:
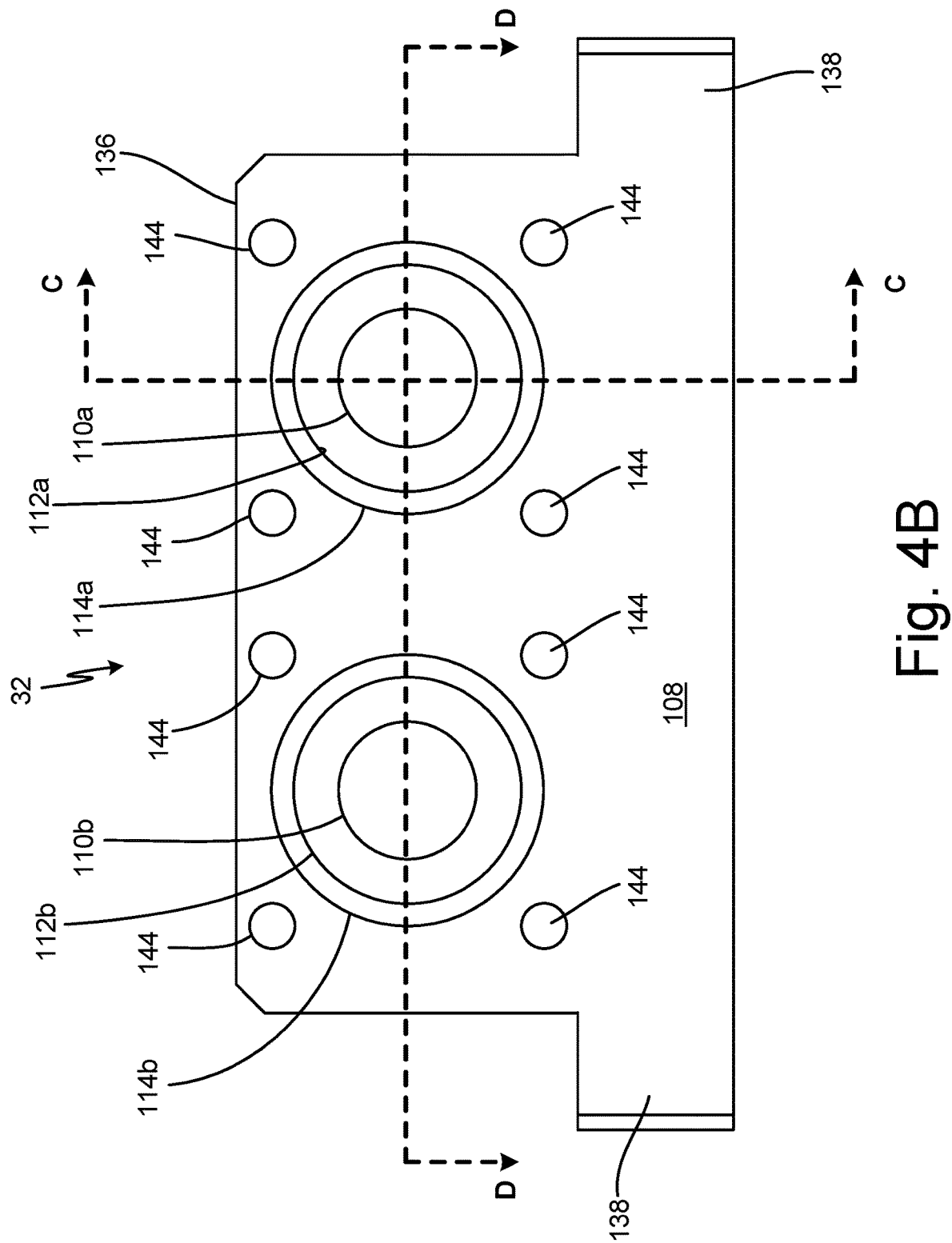
FIG. 4B is a front elevation view of a first bracket.
Figure 4C:
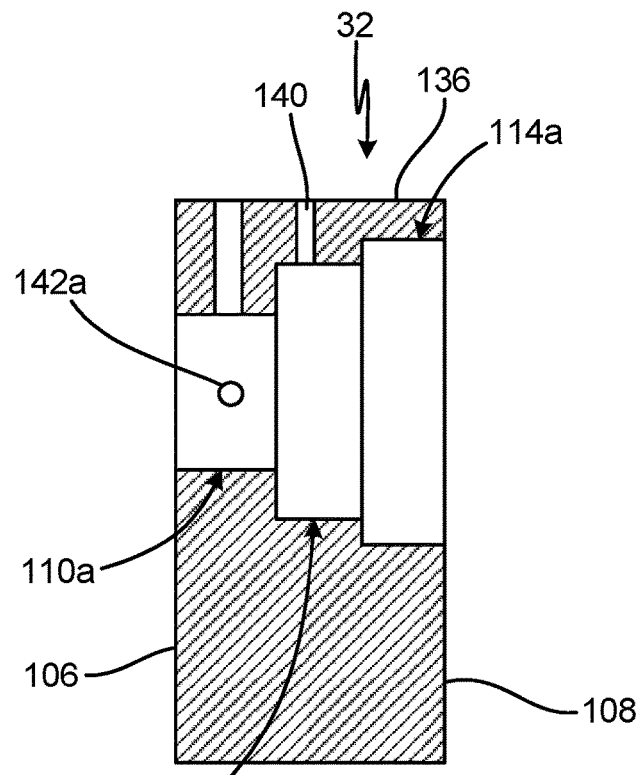
FIG. 4C is a cross-sectional view of the first bracket of FIG. 4A taken along line C-C in FIG. 4A.
Figure 4D:
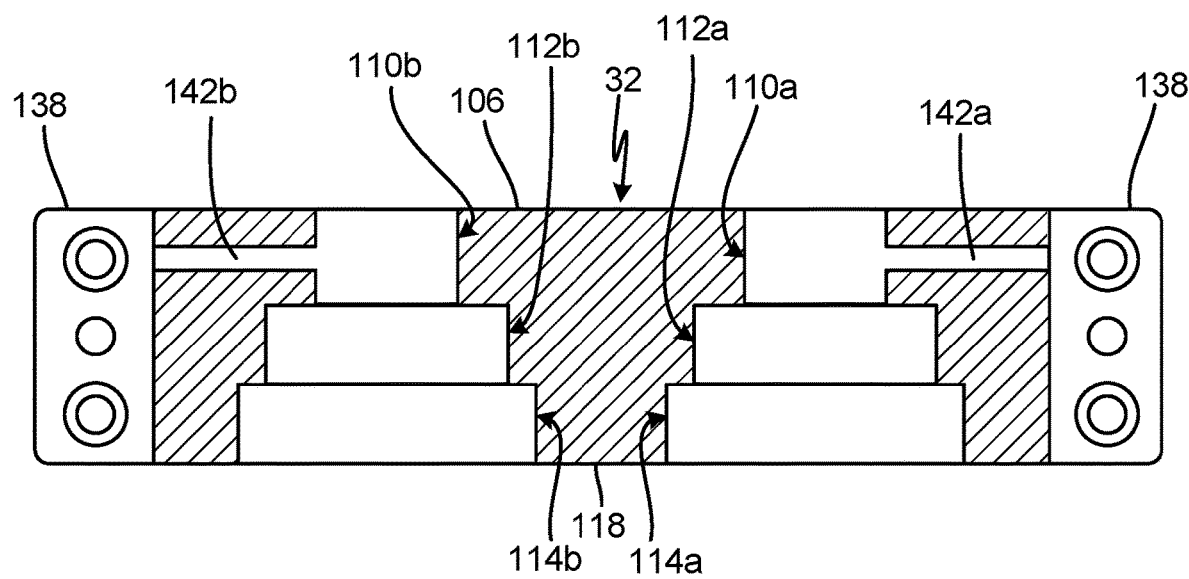
FIG. 4D is a cross-sectional view of the first bracket of FIG. 4A taken along line D-D in FIG. 4A.

FIG. 4A is an isometric view of first cylinder bracket 32. FIG. 4B is a front elevation view of first cylinder bracket 32. FIG. 4C is a cross-sectional view of first cylinder bracket 32 taken along line C-C in FIG. 4B. FIG. 4D is a cross-sectional view of first cylinder bracket 32 taken along line D-D in FIG. 4B. FIGS. 4A-4D will be discussed together. First cylinder bracket 32 includes motor side 106; cylinder side 108; rod bores 110*a*, 110*b*; piston bores 112*a*, 112*b*; cylinder bores 114*a*, 114*b*; top surface 136; mounting flanges 138; vent holes 140 (only one of which is shown); set screw openings 142*a*, 142*b*; and fastener openings 144.

As best seen in FIG. 4D, rod bores 110*a*, 110*b* extend into first cylinder bracket 32 from motor side 106 and are configured to receive rod bushings 58*a*, 58*b* (FIGS. 1A-1B). Cylinder bores 114*a*, 114*b* extend into first cylinder bracket 32 from cylinder side 108 are configured to receive first ends, such as first end 90*a* (FIGS. 2A-2C), of cylinders 52*a*, 52*b* (FIGS. 1A-1B). Piston bores 112*a*, 112*b* are disposed between rod bores 110*a*, 110*b* and cylinder bores 114*a*, 114*b*. Piston bores 112*a*, 112*b* receive a portion of pistons 54*a*, 54*b* (best seen in FIGS. 2A-2C) when pistons 54*a*, 54*b* are in the retracted position shown in FIG. 2A.

As shown in FIG. 4C, vent holes 140 extend through first cylinder bracket 32 from top surface 136 to piston bores 112*a*, 112*b*. Vent holes 140 allow air to flow into and out of piston bores 112*a*, 112*b* during operation, preventing a vacuum condition from occurring during the dispense stroke and preventing overpressurization during a refill stroke. Referring back to FIG. 4D, set screw openings 142*a*, 142*b* extend through first cylinder bracket 32 into rod bores 110*a*, 110*b*. Set screw openings 142*a*, 142*b* are configured to receive set screws (not shown) to secure rod bushings 58*a*, 58*b* within rod bores 110*a*, 110*b*.

Mounting flanges 138 receive fasteners (not shown) to secure first cylinder bracket 32 to base plate (best seen in FIGS. 1A-1B). Fastener openings 144 extend into cylinder side 108 of first cylinder bracket 32. Fastener openings 144 are configured to receive fasteners 35 (FIG. 1B) that extend through second cylinder bracket 34 (best seen in FIGS. 5A-5C) and into first cylinder bracket 32. The fasteners 35 secure first cylinder bracket 32 and second cylinder bracket 34 together with cylinder 52*a*, 52*b* disposed therebetween.

Figure 5A:
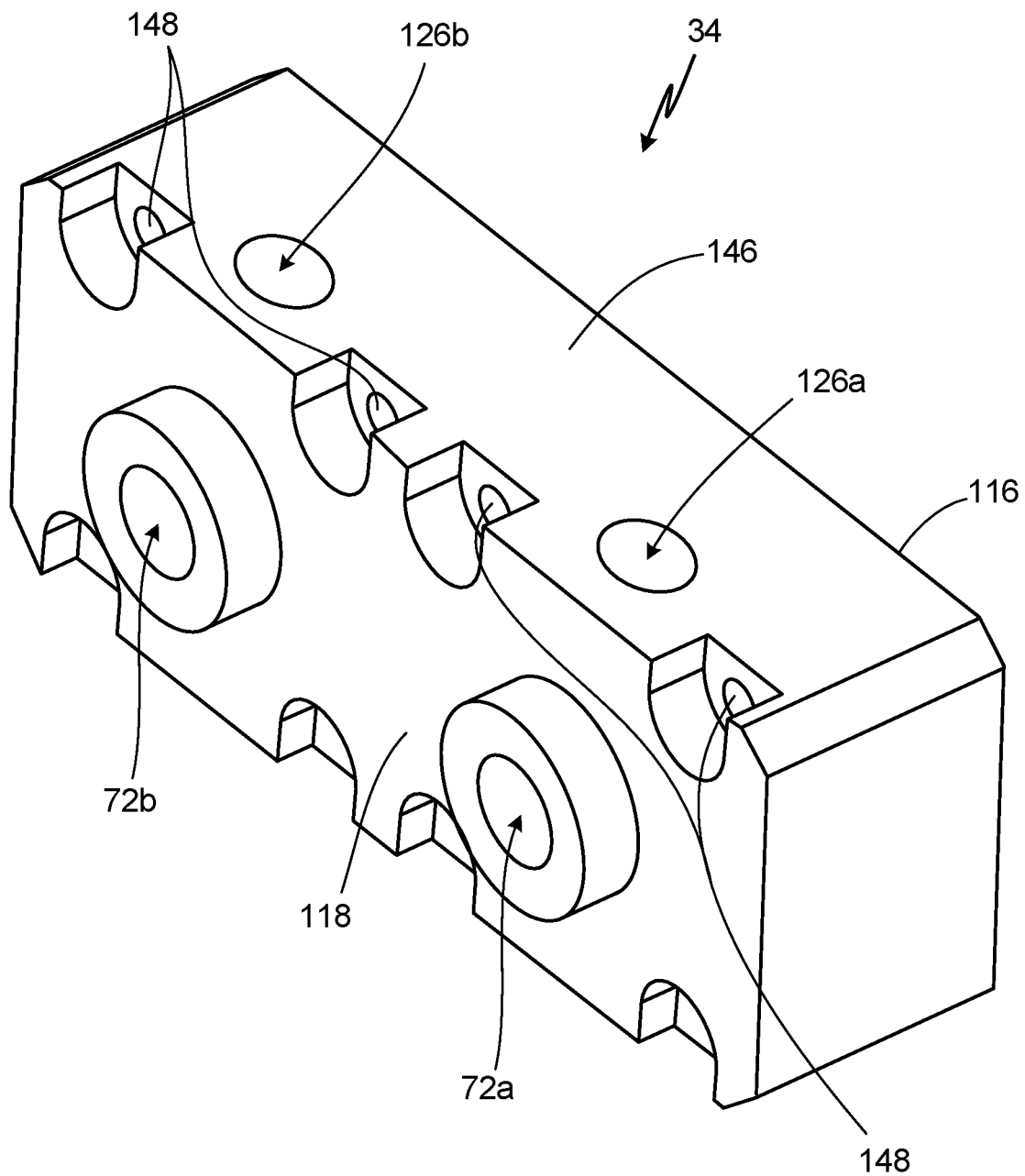
FIG. 5A is an isometric view of a second bracket.
Figure 5B:
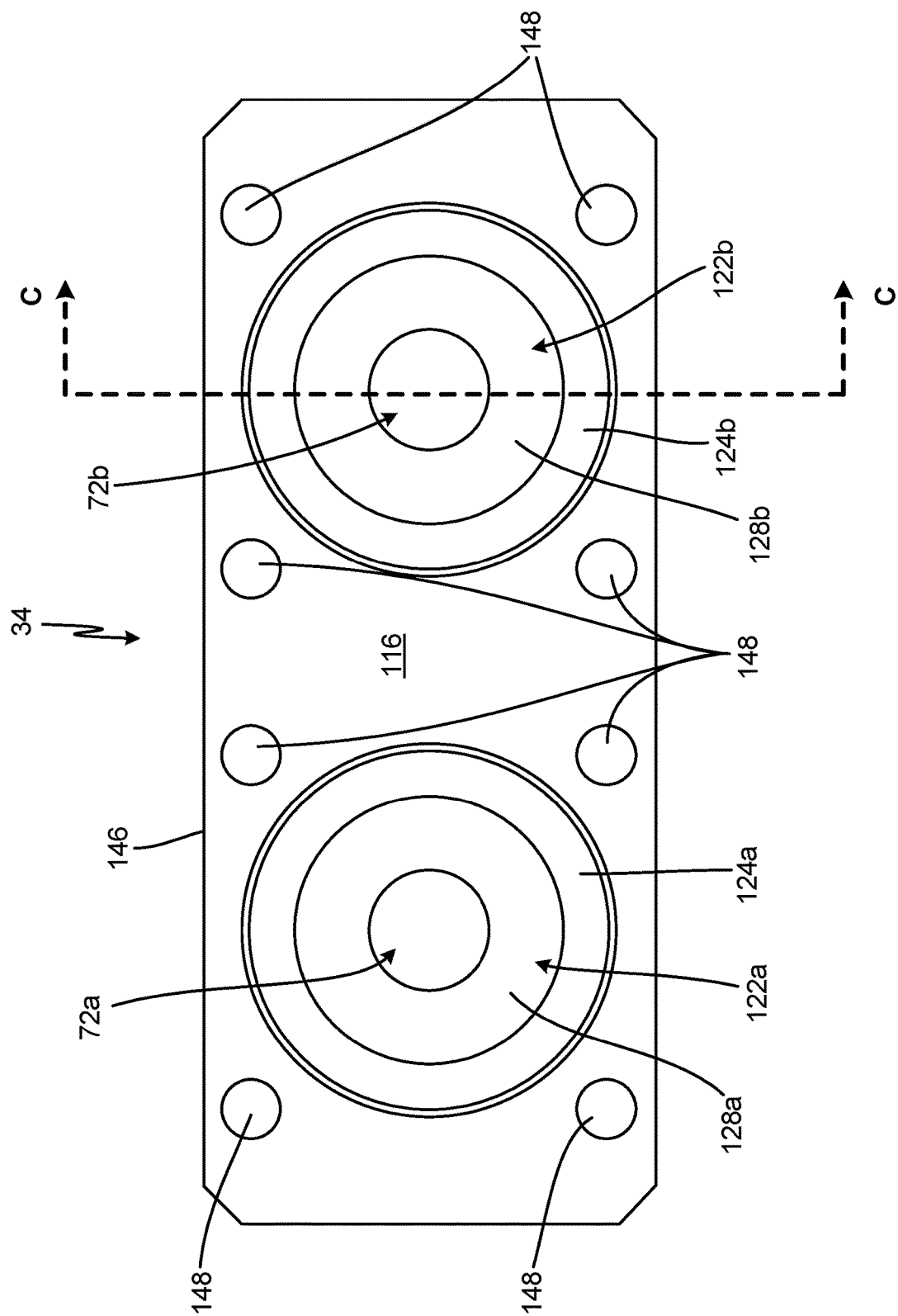
FIG. 5B is a rear elevation view of a second bracket.
Figure 5C:
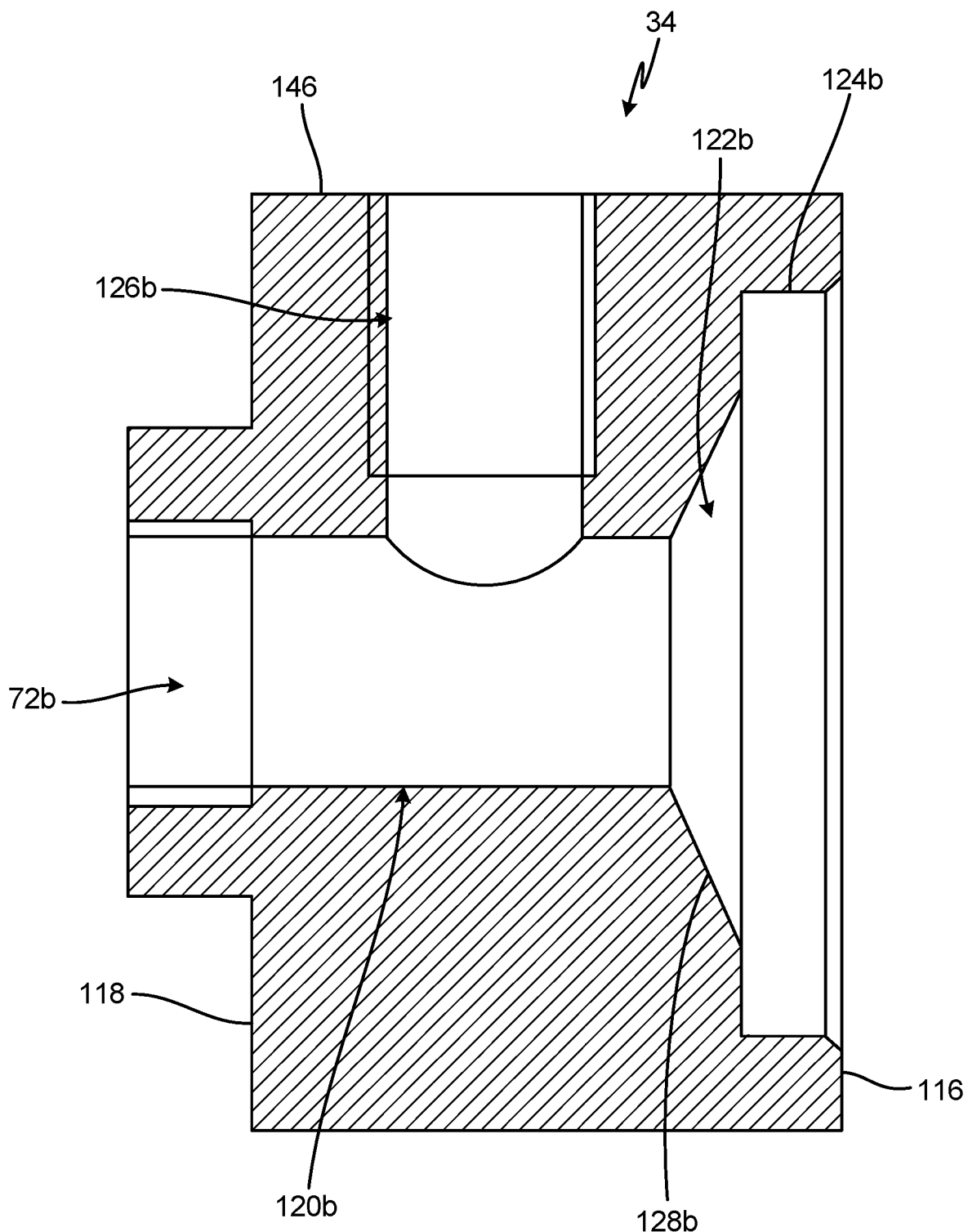
FIG. 5C is a cross-sectional view of the second bracket taken along line C-C in FIG. 5B.

FIG. 5A is an isometric view of second cylinder bracket 34. FIG. 5B is a rear elevation view of second cylinder bracket 34. FIG. 5C is a cross-sectional view of second cylinder bracket 34 taken along line C-C in FIG. 5B. FIGS. 5A-5C will be discussed together. Second cylinder bracket 34 includes material outlets 72*a*, 72*b*; inlet side 116; outlet side 118; material passages 120*a*, 120*b*; material inlets 122*a*, 122*b*; cylinder grooves 124*a*, 124*b*; pressure ports 126*a*, 126*b*; top side 146; and fastener openings 148. Material inlets 122*a*, 122*b* respectively include sloped edges 128*a*, 128*b*.

Cylinder grooves 124*a*, 124*b* extends into inlet side 116 of second cylinder bracket 34. Cylinder grooves 124*a*, 124*b* are configured to receive the second ends, such as second end 92*a* (FIGS. 2A-2C), of cylinders 52*a*, 52*b* (FIGS. 1A-1B). Fastener openings 148 extend through second cylinder bracket 34 from inlet side 116 to outlet side 118. Fastener openings 148 are configured to receive fasteners 35 (FIG. 1B) that pass through fastener openings 148 and extend to fastener openings 144 (best seen in FIG. 4A) in first cylinder bracket 32 (best seen in FIGS. 4A-4D). The fasteners 35 secure second cylinder bracket 34 to first cylinder bracket 32 with cylinders 52*a*, 52*b* clamped between second cylinder bracket 34 and first cylinder bracket 32.

As best understood with reference to FIGS. 5B-5C, material inlets 122*a*, 122*b* extend into inlet side 116 of second cylinder bracket 34 and are surrounded by cylinder grooves 124*a*, 124*b*. Material inlets 122*a*, 122*b* are configured to receive the material flowing out of cylinders 52*a*, 52*b*. Sloped edges 128*a*, 128*b* are annular sloped surfaces disposed at material inlets 122*a*, 122*b* that are configured to provide smooth flowpaths between cylinders 52*a*, 52*b* and material passages 120*a*, 120*b*. Sloped edges 128*a*, 128*b* eliminate sharp edges from the flowpath of the material, preventing the material from accumulating within second cylinder bracket 34.

Material passages 120a, 120b extend through second cylinder bracket 34 between material inlets 122a, 122b and material outlets 72. Pressure ports 126a, 126b extend into second cylinder bracket 34 through top side 146. Pressure ports 126a, 126b are fluidly connected to material passage 120a, 120b such that the material in pressure ports 126a, 126b is at the same fluid pressure as the material in material passages 120a, 120b. Pressure ports 126a, 126b are configured to receive a pressure sensor, such as transducers 36a, 36b (FIG. 1C) or a pressure gauge, that senses the fluid pressure within pressure ports 126a, 126b. Material outlets 72 extend into outlet side 118 of second cylinder bracket 34 and provide a port for the material to exit second cylinder bracket 34. In some examples, material outlets 72 can include threading configured to interface with a receiving device, such as outlet valve 42 (FIG. 1C) or a hose.

Figure 6A:
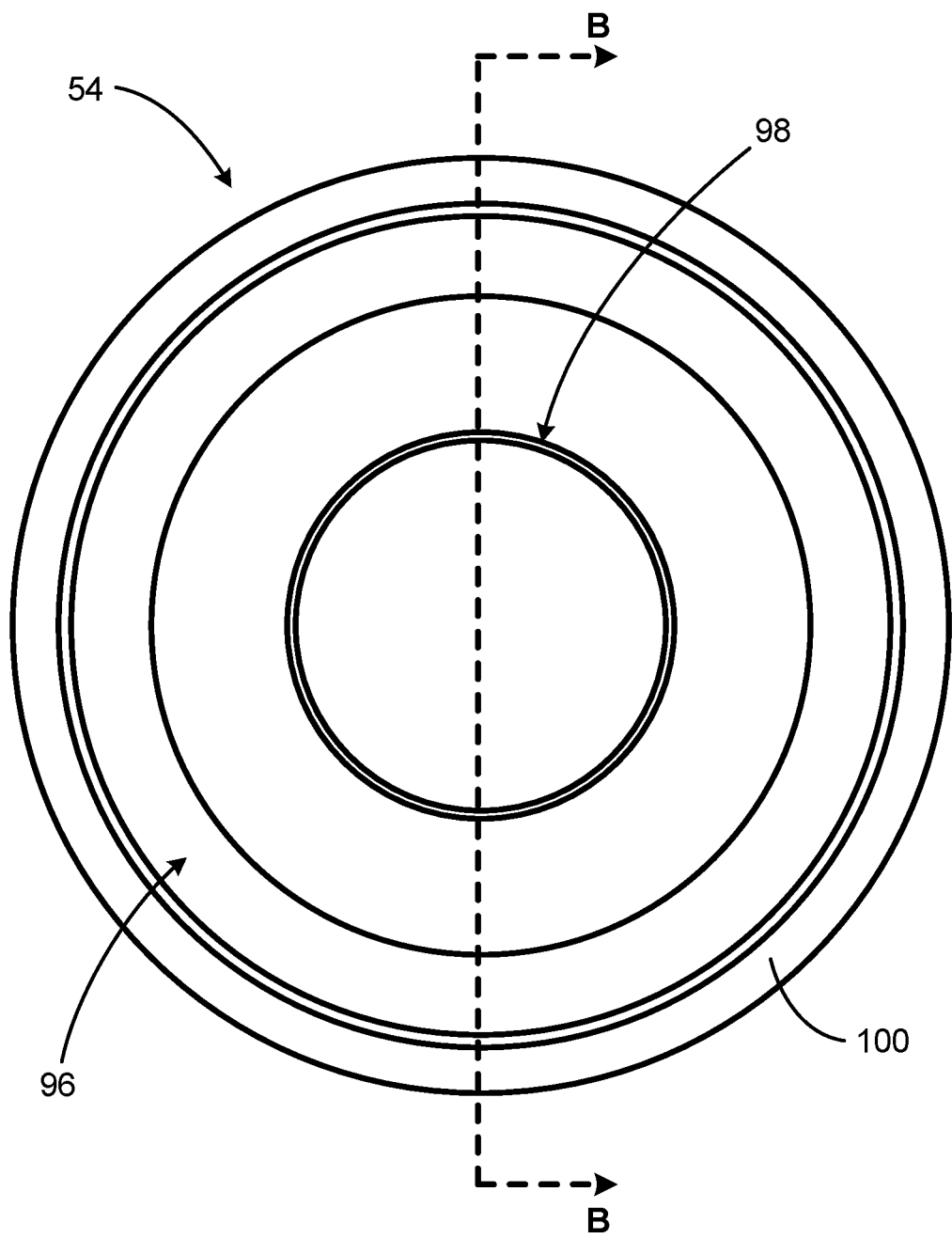
FIG. 6A is a front elevation view of a piston.
Figure 6B:
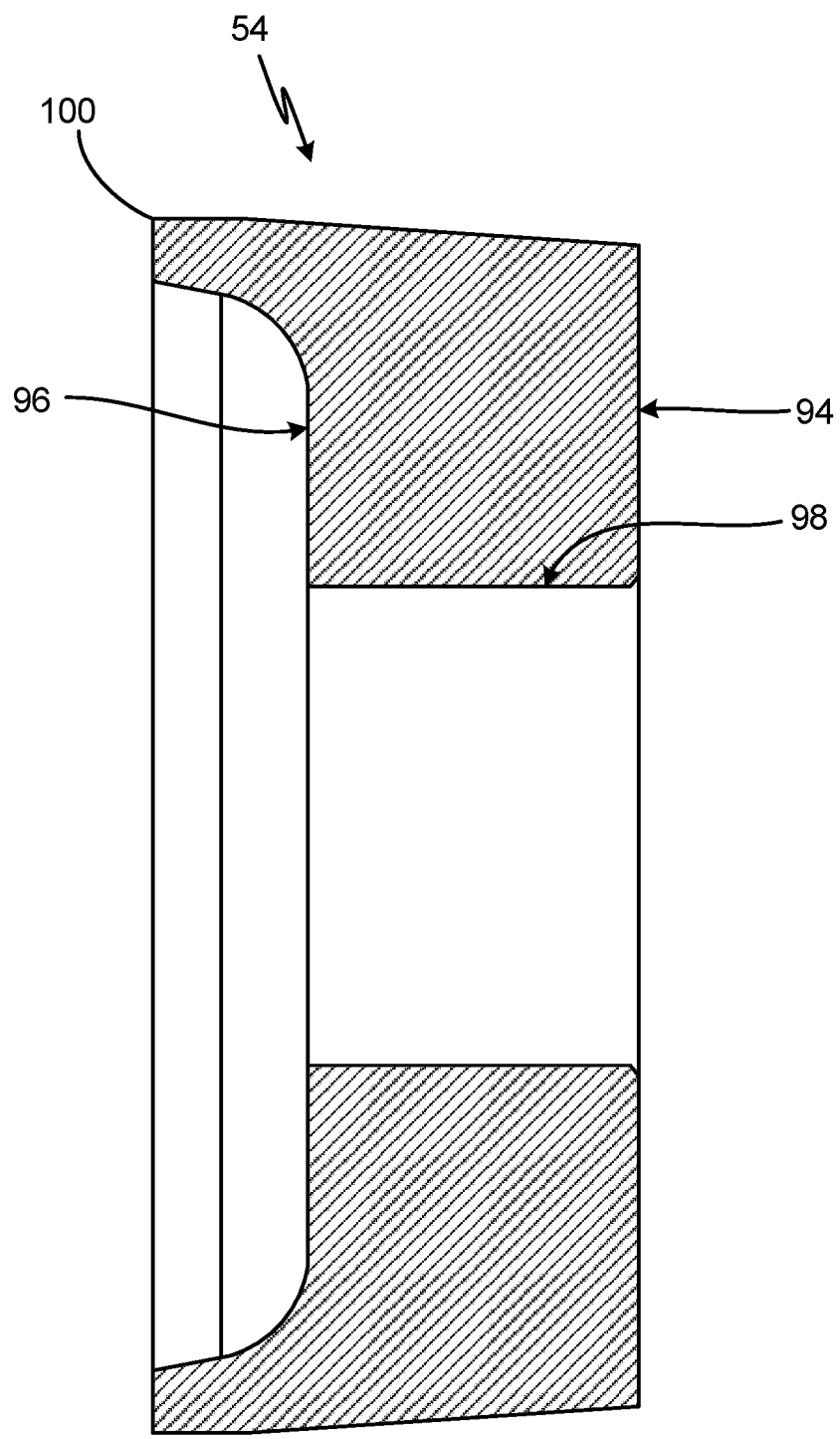
FIG. 6B is a cross-sectional view of the piston in FIG. 6A taken along line B-B in FIG. 6A.

FIG. 6A is a front elevation view of piston 54. FIG. 6B is a cross-sectional view of piston 54 taken along line B-B in FIG. 6A. FIGS. 6A and 6B will be discussed together. Piston 54 is representative of pistons 54a, 54b. Piston 54 includes upstream end 94, downstream end 96, and central bore 98. Downstream end 96 includes lip 100.

Central bore 98 extends through piston 54 between upstream end 94 and downstream end 96. Central bore 98 is configured to receive an end of rod 48 (FIGS. 7A-7B) extending through central bore 98. Lip 100 is disposed at the periphery of downstream end 96 of piston 54. Lip 100 is configured to interface with an inner wall of cylinders 52a, 52b (FIGS. 1A-1B) and provide a seal therebetween.

As shown in FIG. 6B, downstream end 96 of piston 54 is concave. The concavity of downstream end 96 encourages circulation of the material as piston 54 moves through cylinders 52a, 52b.

Piston 54 is configured to drive material downstream out of cylinders 52a, 52b during operation. As piston 54 is driven in the downstream direction, lip 100 separates any material from the inner wall of cylinders 52a, 52b, and the concave downstream end 96 causes circulation in the material. Encouraging circulation prevents pack out and prevents material from sticking to cylinders 52a, 52b, which can lead to curing and excessive wear. Piston 54 can be formed of any suitable material for creating a durable, dynamic seal with the cylinders 52a, 52b. In one example, piston 54 is formed from a synthetic polymer, such as nylon.

Figure 7A:
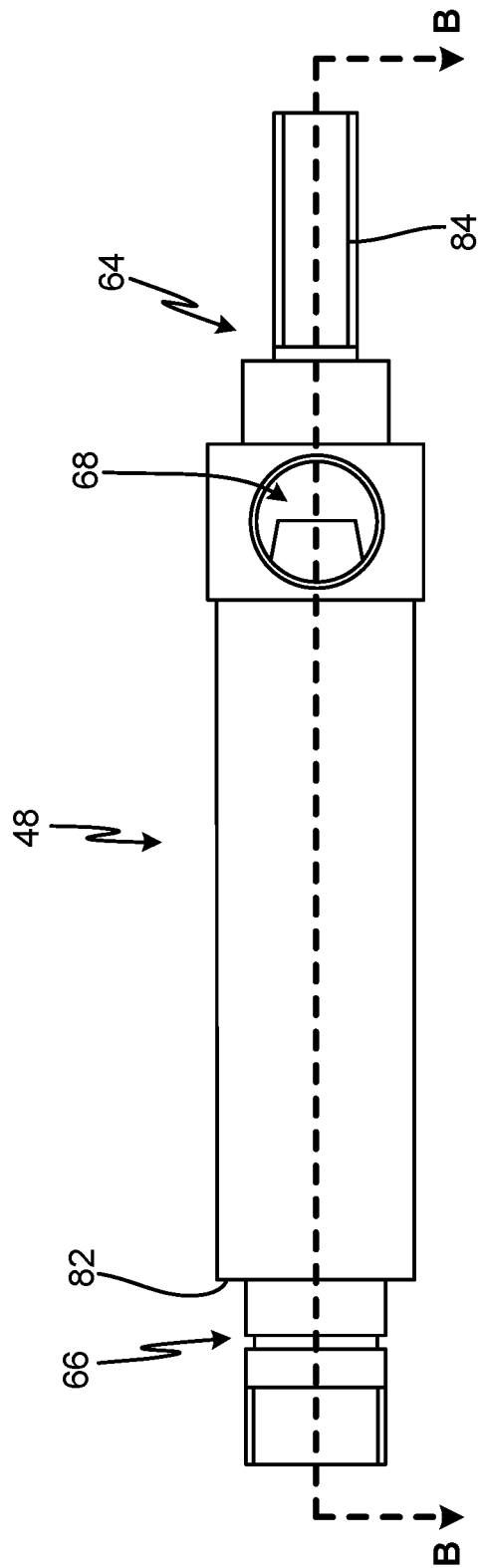
FIG. 7A is a top elevation view of a rod.
Figure 7B:
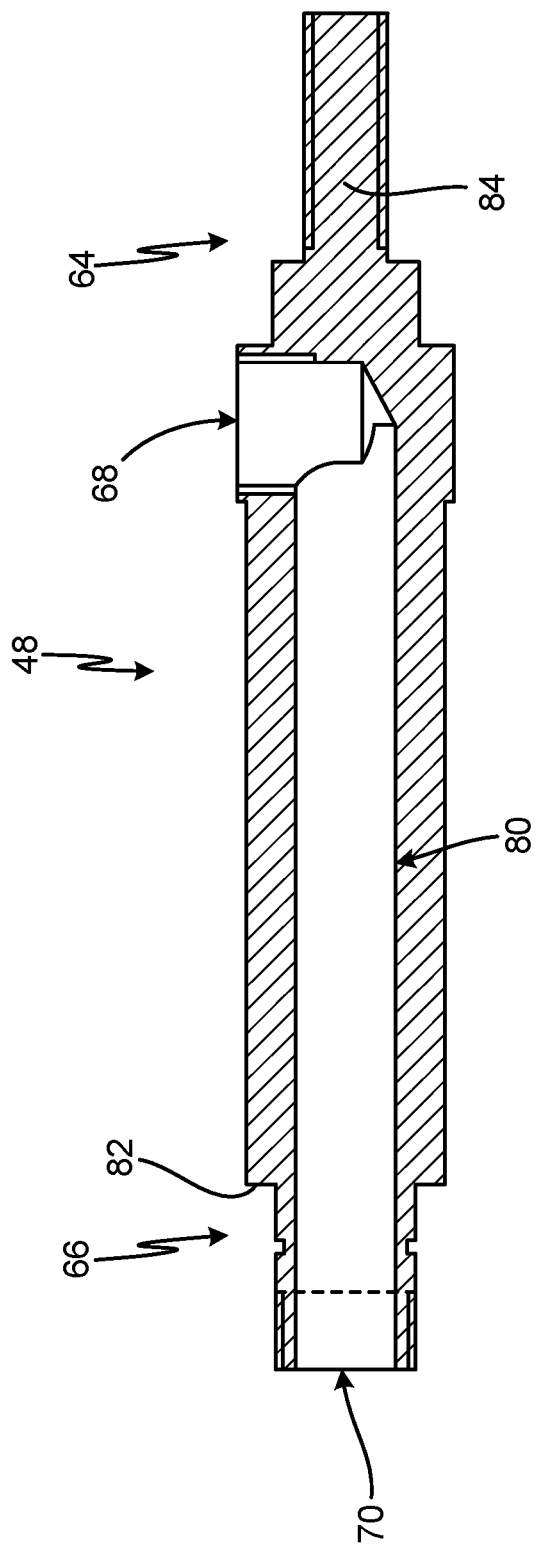
FIG. 7B is a cross-sectional view of the rod in FIG. 7A taken along line B-B in FIG. 7A.

FIG. 7A is a top elevation view of rod 48. FIG. 7B is a cross-sectional view of rod 48 taken along line B-B in FIG. 7A. FIGS. 7A and 7B will be discussed together. It is understood that rod 48 is representative of rods 48a, 48b. Rod 48 includes first rod end 64, second rod end 66, rod inlet 68, rod outlet 70, rod passage 80, shoulder 82, and projection 84.

Projection 84 extends from first end 64 of rod 48. Projection 84 is configured to be received by floating nut 50 (FIGS. 8A-8B) to connect rod 48 to floating nut 50. Projection 84 can include external threading to facilitate the connection with floating nut 50. Shoulder 82 projects from rod 48 proximate second end 66 and retains piston 54 (FIGS. 6A and 6B) on rod 48. Second end 66 of rod 48 is configured to extend through central bore 98 (best seen in FIG. 6B) in piston 54. Second end 66 receives a piston nut 62a, 62b (FIGS. 1A-1B) to secure piston 54 to rod 48. In some examples, second end 66 includes threading configured to interface with threading on piston nuts 62a, 62b to facilitate the connection between second end 66 and piston nut 62a, 62b.

As best seen in FIG. 7B, rod inlet 68 extends into rod 48 and is configured to receive material from a fluid source, such as fluid source 16. Rod inlet 68 can include internal threading to facilitate the connection of the fluid source to rod 48. Rod outlet 70 is disposed at second end 66 of rod 48. Rod passage 80 extends through rod 48 between rod inlet 68 and rod outlet 70. During operation, material enters rod 48 through rod inlet 68, flows through rod passage 80, and is ejected from rod 48 through rod outlet 70.

Figure 8A:
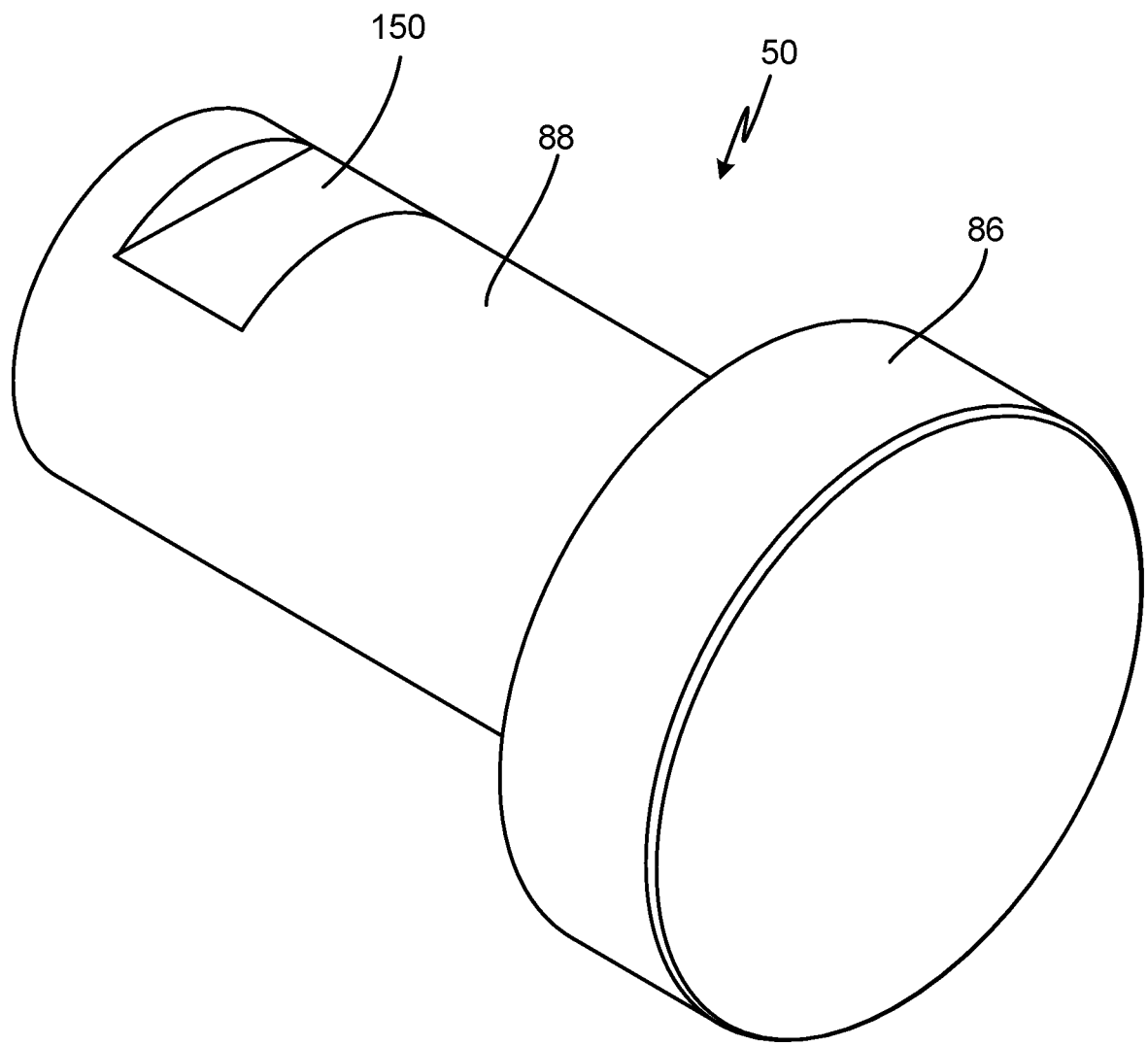
FIG. 8A is an isometric view of a floating nut.
Figure 8B:
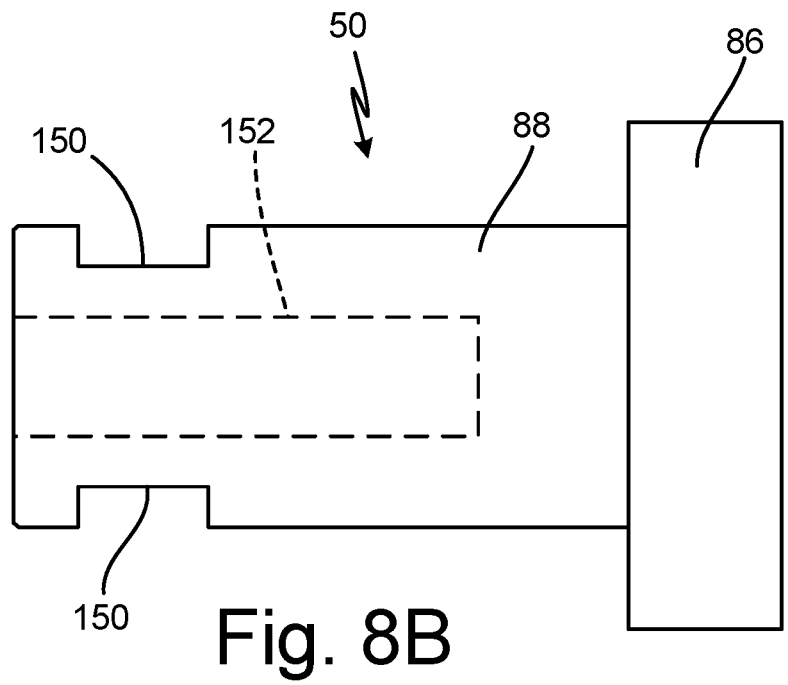
FIG. 8B is a side elevation view of a floating nut.
Figure 8C:
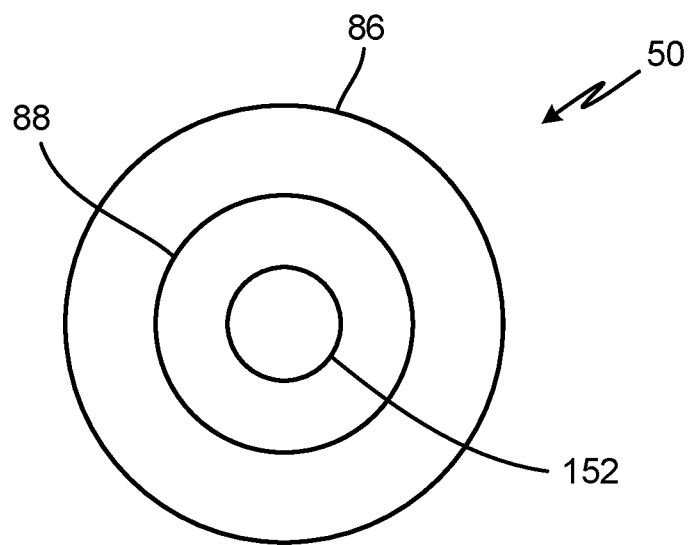
FIG. 8C is a rear elevation view of a floating nut.

FIG. 8A is an isometric view of floating nut 50. FIG. 8B is a side elevation view of floating nut 50. FIG. 8C is a rear elevation view of floating nut 50. FIGS. 8A-8C will be discussed together. Floating nut 50 is representative of floating nuts 50a, 50b. Floating nut 50 includes head 86 and shaft 88. Shaft 88 includes flats 150 and rod receiving chamber 152.

Head 86 of floating nut 50 is configured to be disposed in one of chambers 102a, 102b (FIG. 3A) of slide bracket 30 (best seen in FIGS. 3A-3B). Shaft 88 is configured to extend out of chambers 102a, 102b through slide nuts 56a, 56b (FIGS. 1A-1B).

Rod receiving chamber 152 extends into shaft 88 and is configured to receive projection 84 (best seen in FIGS. 7A-7B) of rod 48 (FIGS. 7A-7B). In some examples, rod receiving chamber 152 can include threading configured to interface with threading on projection 84. It is understood, however, that floating nut 50 can be attached to rod 48 in any desired manner, such as by a bayonet connection, a press-fit connection, a pinned connection, or any other suitable connection for transferring driving forces from floating nut 50 to rod 48. In some examples, the connection allows for the position of floating nut 50 on projection 84 to be adjusted by rotating floating nut 50 relative to rod 48. Flats 150 are disposed on shaft 88 and are configured to facilitate a user rotating floating nut 50 to adjust the position of floating nut 50 on projection 84. For example, the jaws of a wrench can be placed on flats 150.

Although the present invention has been described with reference to preferred embodiments, workers skilled in the art will recognize that changes may be made in form and detail without departing from the spirit and scope of the invention.

The invention claimed is:

1. A plural material dispensing system comprising:
   a motor;
   a slide bracket connected to and configured to be driven by the motor;
   a first cylinder;
   a first pump rod mounted to the slide bracket and extending into the first cylinder,
      the first pump rod comprising:
      a first fluid inlet extending into the first pump rod;
      a first fluid outlet extending through a first end of the first pump rod disposed within the first cylinder; and
      a first flow path extending through the first pump rod between the first fluid inlet and the first fluid outlet;
   a first piston mounted on the first end of the first pump rod;
   a second cylinder;
   a second pump rod mounted to the slide bracket and extending into the second cylinder, the second pump rod comprising:
      a second fluid inlet extending into the second pump rod;

a second fluid outlet extending through a first end of the second pump rod disposed within the second cylinder; and a second flow path extending through the second pump rod between the second fluid inlet and the second fluid outlet; and a second piston mounted on the first end of the second pump rod;

wherein the slide bracket is configured to drive the first pump rod, first piston, second pump rod, and second piston in a first direction during a dispense stroke and a second direction during a refill stroke.

2. The dispensing system of claim 1, further comprising:
a first chamber extending into a side of the slide bracket;
a second chamber extending into the side of the slide bracket;
a first floating nut disposed within and extending from the first chamber, the first floating nut connected to a second end of the first pump rod and configured to transmit driving forces from the slide bracket to the first pump rod; and
a second floating nut disposed within and extending from the second chamber, the second floating nut connected to a second end of the second pump rod and configured to transmit driving forces from the slide bracket to the second pump rod.

3. The dispensing system of claim 2, wherein:
the first floating nut includes a first head disposed within the first chamber and a first shaft extending from the first head and connected to the second end of the first pump rod;
the second floating nut includes a second head disposed within the second chamber and a second shaft extending from the second head and connected to the second end of the second pump rod.

4. The dispensing system of claim 3, wherein the first shaft is connected to the first pump rod by interfaced threading.

5. The dispensing system of claim 1, further comprising:
a first bracket having a cylinder side, a rod side, and a top side, wherein the first bracket supports the first cylinder and the second cylinder, wherein the first pump rod extends through the first bracket into the first cylinder, and wherein the second pump rod extends through the first bracket into the second cylinder.

6. The dispensing system of claim 5, further comprising:
a first rod bore extending into the rod side of the first bracket and having a first diameter;
a first cylinder bore extending into the cylinder side of the first bracket and disposed coaxially with the first rod bore, the first cylinder bore having a second diameter; and
a first piston bore disposed between the first rod bore and the first cylinder bore, the first piston bore having a third diameter;
wherein a first end of the first cylinder is disposed in the first cylinder bore, and the first piston rod extends into the first bracket through the first rod bore; and
wherein the third diameter is larger than the first diameter and smaller than the second diameter.

7. The dispensing system of claim 6, further comprising:
a first vent hole extending through the first bracket into the piston bore.

8. The dispensing system of claim 5, further comprising:
a second bracket having an outlet side, an inlet side, a second top side, a first material flow passage extending through the second bracket between the inlet side and the outlet side, and a second material flow passage extending through the second bracket between the inlet side and the outlet side;
wherein the second bracket supports the first cylinder and the second cylinder.

9. The dispensing system of claim 8, further comprising:
a first pressure port extending from the second top side of the second bracket into the first material flow passage.

10. The dispensing system of claim 8, wherein:
the first material flow passage extends between a first material inlet in the inlet side and a first material outlet in the outlet side; and
a first cylinder groove extends around the first material inlet, the first cylinder groove configured to receive a second end of the first cylinder.

11. The dispensing system of claim 10, wherein the first material inlet includes a first sloped edge extending between the cylinder groove and the material flow passage.

12. The dispensing system of claim 1, wherein:
the first piston comprises:
a first upstream end;
a first downstream end, the first downstream end being concave; and
a first central bore extending between the first upstream end and the first downstream end, wherein the first end of the first pump rod extends through the first central bore.

13. The dispensing system of claim 12, further comprising:
a piston nut disposed on the first end of the first pump rod and securing the first piston on the first pump rod.

14. The dispensing system of claim 13, wherein the piston nut is connected to the first end of the first pump rod by interfaced threading on the first end of the first pump rod and the piston nut.

15. The dispensing system of claim 1, further comprising:
a first inlet valve disposed upstream of the first fluid inlet and configured to control the flow of a first material into the first fluid inlet;
a second inlet valve disposed upstream of the second fluid inlet and configured to control flow of a second material into the second fluid inlet;
a first outlet valve disposed downstream of the first cylinder and configured to control flow of the first material out of the first cylinder;
a second outlet valve disposed downstream of the second cylinder and configured to control flow of the second material out of the second cylinder;
wherein each of the first inlet valve, the second inlet valve, the first outlet valve, and the second outlet valve are actively controlled valves.

16. The dispensing system of claim 15, further comprising:
a controller configured to control dispense and reload cycles of the dispensing system, the controller comprising:
control circuitry; and
a memory encoded with instructions that, when executed by the control circuitry, cause the control circuitry to initiate and proceed through a dispense cycle and a reload cycle;
wherein during the dispense cycle, the control circuitry causes the first inlet valve and the second inlet valve to enter a closed state, causes the first outlet valve and the second outlet valve to enter an open state, and causes the motor to displace the slide bracket in a first direction to cause the first piston to drive the first material downstream through the first outlet valve and the second piston to drive the second material downstream through the second outlet valve; and wherein during the reload cycle, the control circuitry causes the first outlet valve and the second outlet valve to enter a closed state, causes the first inlet valve and the second outlet valve to enter an open state, and causes the motor to displace the slide bracket in a second direction to cause the first piston and second piston to move in the second direction and increase an available volume in the first cylinder and the second cylinder;

wherein during the reload cycle, the first material is configured to flow to the first cylinder through the first flow path in the first pump rod and is provided to the first cylinder by the first fluid outlet in the first pump rod, and the second material is configured to flow to the second cylinder through the second flow path in the second pump rod and is provided to the second cylinder by the second fluid outlet in the second pump rod.

17. The dispensing system of claim 16, wherein:

the memory is encoded with further instructions that, when executed by the control circuitry, cause the control circuitry to initiate and proceed through a pressurization cycle; and during the pressurization cycle, the control circuitry causes the first inlet valve, the second inlet valve, the first outlet valve, and the second outlet valve to be in the closed state, causes motor to displace the slide bracket in the first direction to increase the material pressure in the first cylinder and in the second cylinder, and causes the motor to stop displacing the slide bracket in the first direction based on pressure information received from at least one of a first pressure sensor configured to sense the material pressure in the first cylinder and a second pressure sensor configured to sense the material pressure in the second cylinder.

18. The dispensing system of claim 1, wherein a first material pumped by the first pump rod and the first piston is configured to combine with a second material pumped by the second pump rod and the second piston at a location downstream of the first cylinder and the second cylinder to form a thermal interface material.

19. A pump comprising:

a slide bracket configured to move longitudinally in a first downstream direction and a second upstream direction;

a first bracket spaced from the slide bracket, the first bracket comprising:
 a rod bore extending into an upstream side of the first bracket; and
 a cylinder bore extending into a downstream side of the first bracket;

a second bracket spaced from the first bracket, the second bracket comprising:
 an inlet side and an outlet side;
 a material inlet disposed in the inlet side;
 a material outlet disposed in the outlet side; and
 a material flowpath extending between the material inlet and the material outlet;

a cylinder having a first cylinder end and a second cylinder end, wherein the cylinder is retained between the first bracket and the second bracket;

a pump rod connected to the slide bracket and extending into the first bracket through the rod bore, the pump rod comprising:
 a first rod end disposed proximate the slide bracket;
 a second rod end disposed at an opposite end of a rod body from the first rod end, the second rod end including a fluid outlet extending into the second rod end; and
 a flow path extending through the rod body between a fluid inlet extending into the rod body and the fluid outlet;

a piston mounted on the second rod end and disposed within the cylinder, wherein the piston includes an upstream side and a downstream side;

wherein the pump rod is configured to receive material through the fluid inlet and provide the material to the cylinder through the fluid outlet in the second rod end; and wherein the pump rod is configured to drive piston, and the piston is configured to drive the material from the cylinder into the second bracket through the material inlet.

20. A method of dispensing, the method comprising:

initiating a reload cycle, the reload cycle comprising:
 shifting a first inlet valve to a first open state, a second inlet valve to a second open state, a first outlet valve to a first closed state, and a second outlet valve to a second closed state;
 activating a motor to cause the motor to displace a slide bracket in an upstream direction, wherein the slide bracket is connected to a first pump rod and a second pump rod such that the slide bracket:
  draws the first pump rod in the upstream direction, the first pump rod extending into a first pump cylinder through a first bracket, and a first piston mounted on an end of the first pump rod extending into the first pump cylinder; and
  draws the second pump rod in the upstream direction, the second pump rod extending into a second pump cylinder and a second piston mounted on an end of the second pump rod extending into the second pump cylinder;
 driving a first material into the first pump rod through a first pump rod inlet;
 driving a second material into the second pump rod through a second pump rod inlet; and
 refilling the first pump cylinder with the first material flowing through the first pump rod from the first pump rod inlet to a first pump rod outlet; and
 refilling the second pump cylinder with the second material flowing through the second pump rod from the second pump rod inlet to a second pump rod outlet;

shifting the first inlet valve and the second inlet valve to respective closed states;

initiating a dispense cycle, the dispense cycle comprising:
 shifting the first outlet valve and the second outlet valve to respective open states; and
 activating the motor to cause the motor to displace the slide bracket in a downstream direction opposite the upstream direction to:
  drive the first pump rod in the downstream direction, the first pump rod driving the first piston through the first pump cylinder, and the first piston driving the first material out of the first pump cylinder through a second bracket supporting the first pump cylinder; and
  drive the second pump rod in the downstream direction, the second pump rod driving the second piston through the second pump cylinder, and the second piston driving the second material out of the second pump cylinder through the second bracket.

* * * * *